US012614183B1

(12) United States Patent
Kallas et al.

(10) Patent No.: US 12,614,183 B1
(45) Date of Patent: *Apr. 28, 2026

(54) DETECTING AND REMEDIATING ANOMALIES IN INSTITUTIONAL FINANCIAL INSTRUMENTS USING IMAGE PROCESSING

(71) Applicant: U.S. Bank National Association, Minneapolis, MN (US)

(72) Inventors: Christopher Kallas, Grafton, WI (US); Wentao Lu, Minnetonka, MN (US); Hun Jeong Kang, Eagan, MN (US); Chenglin Zhang, Eden Prairie, MN (US); Yuan Cheng, Cary, NC (US); Ding Ma, Thousand Oaks, CA (US); Xiaoqiao Wei, Woodbury, MN (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/314,828

(22) Filed: Aug. 29, 2025

Related U.S. Application Data

(63) Continuation of application No. 19/188,433, filed on Apr. 24, 2025, now Pat. No. 12,437,303, which is a
(Continued)

(51) Int. Cl.
G06Q 20/40       (2012.01)
G06Q 20/04       (2012.01)
(Continued)

(52) U.S. Cl.
CPC ....... *G06Q 20/4016* (2013.01); *G06Q 20/042* (2013.01); *G06V 30/19013* (2022.01); *G06V 30/416* (2022.01); *G06V 30/42* (2022.01)

(58) Field of Classification Search
None
See application file for complete search history.

(56) References Cited

U.S. PATENT DOCUMENTS

| | | | |
|---|---|---|---|
| 8,837,806 B1 | 9/2014 | Ethington et al. | |
| 2004/0247168 A1* | 12/2004 | Pintsov .............. | G06V 30/1444 382/209 |

(Continued)

OTHER PUBLICATIONS

Dynamsoft, USPS Intelligent Mail—Dynamsoft Barcode Reader SDK, copyright 2003-2024, 1 page.
(Continued)

*Primary Examiner* — Bennett M Sigmond
*Assistant Examiner* — Bhavin D Shah
(74) *Attorney, Agent, or Firm* — Merchant & Gould, P.C.

(57) ABSTRACT
Methods and systems for processing a financial instrument, such as a check, are provided. An example method includes performing a text extraction process on a check image to obtain check textual information, and decoding an intelligent mail barcode (IMB) in the check image to obtain a character code. The method further includes utilizing the character code to extract encoded check information including a payee ZIP code from the IMB. The method also includes performing a fraud detection process on the check image based on at least one of (1) scores generated during the text extraction process, or (2) inconsistency between the check textual information and the encoded check information.

19 Claims, 18 Drawing Sheets

Related U.S. Application Data continuation of application No. 18/930,543, filed on Oct. 29, 2024.

(51) Int. Cl.

| | | |
|---|---|---|
| *G06V 30/19* | (2022.01) | |
| *G06V 30/416* | (2022.01) | |
| *G06V 30/42* | (2022.01) | |
| *H04L 9/40* | (2022.01) | |

(56)         References Cited

U.S. PATENT DOCUMENTS

| | | | |
|---|---|---|---|
| 2008/0140579 | A1 | 6/2008 | Sanjiv |
| 2011/0155808 | A1 | 6/2011 | Neves et al. |
| 2022/0100980 | A1 | 3/2022 | Simpson |
| 2022/0309856 | A1* | 9/2022 | Kriegsfeld ........... G07D 7/2083 |
| 2022/0398399 | A1 | 12/2022 | Muffat et al. |
| 2023/0351349 | A1 | 11/2023 | Milam et al. |
| 2023/0368557 | A1 | 11/2023 | Kolavennu et al. |

OTHER PUBLICATIONS

Cox, Amanda, What Are Intelligent Mail Barcodes? Jun. 12, 2023, 2 pages.

* cited by examiner

Institutional Check 30

User Device 12

User U

Deposit Institution 50

ATM 14

Scanner/
Imager 14

Settlement
Process

Government Entity 20

Government Financial Institution
60

100

400

Obtain Check Image(s), Adjust and Select Image 502

Identify Objects in Check 504

Perform Text Extraction Process 506

Decode Graphical Code Detected in Check Image 508

Extract Encoded Check Information from Graphical Code 510

Perform Fraud Detection Process(es) 512   →  Review Fraud Candidates

Initiate Deposit Transaction 514

500

Cluster Localized Match Scores 702

Identify Best-Match Position Within Cluster 704

Assign Character Identity and Location Based on Best-Match Position 706

700

800

Character "M" at Matrix Position [X, Y]

Character "M" at Matrix Position [Z, Y]

900

Determine IMB Height Using Aggregated Pixel Denisities 1102

Determine Vertical Bar Pixel Densities 1104

Calculate Individual Pixel Densities in Track Region, Ascending Region, Descending Region for Each Bar 1106

Determine Character Code Based on Denoised Vertical Bar Code 1108

1100

Distort, Mask, Sharpen

Image Inversion

1310

1320

1402    1404    1400

1600

12 03 22 20098900  KANSAS CITY, MO    4044 03456725
12 03 22 20098900  KANSAS CITY, MO    4044 03456725

1710

$****3500*00
$****3500*00

1720

NEW YORK NY 10023 7253

1730

DETECTING AND REMEDIATING ANOMALIES IN INSTITUTIONAL FINANCIAL INSTRUMENTS USING IMAGE PROCESSING

CROSS-REFERENCE TO RELATED APPLICATIONS

The present application is a continuation of U.S. patent application Ser. No. 19/188,433, filed Apr. 24, 2025, which is a continuation of U.S. patent application Ser. No. 18/930, 543, filed Oct. 29, 2024, the disclosures of which are hereby incorporated by reference in their entirety.

BACKGROUND

Various institutions, such as governmental entities including the U.S. Treasury or state revenue departments, as well as banks or credit unions, still issue checks to individuals and businesses. These institutional checks are similar to consumer checks but often include additional features, such as barcodes to facilitate mailing (e.g., an intelligent mail barcode (IMB) or a two-dimensional bar code). Checks, including institutional checks, are deposited by the individual payees using a variety of methods. Individual payees may bring such checks to a bank, deposit those checks at an automated teller machine (ATM) or initiate mobile deposit using a mobile phone or other computing device. In each instance, modern check clearance systems capture an image of the check to be used as part of the check clearance process.

But, in part because of their value and low-tech nature, institutional financial instruments can be targets for malicious actors. A malicious recipient of an institutional financial instrument may alter information on an institutional check to cause the check to convey a larger amount of money than the institution intended. In addition, a malicious actor may intercept an institutional financial instrument before it reaches the intended recipient. That actor may then forge the financial instrument (e.g., by modifying a name on the instrument) so a financial institution will allow the malicious actor to receive the funds rather than the intended recipient.

As forgery techniques improve, detecting malicious checks becomes increasingly difficult. Further, given the relatively low number of malicious deposit attempts with financial instruments, anomaly detection processes may result in unacceptable levels of false positives or delays within the check clearance process.

SUMMARY

In a first aspect, a method of detecting and remediating anomalies using image processing is provided. The method includes performing a text extraction process on a check image to obtain check textual information, and decoding an intelligent mail barcode (IMB) in the check image to obtain a character code. The method further includes utilizing the character code to extract encoded check information including a payee ZIP code from the IMB. The method also includes performing a fraud detection process on the check image based on at least one of (1) scores generated during the text extraction process, or (2) inconsistency between the check textual information and the encoded check information.

In a second aspect, a system for processing a financial instrument, such as a check, is provided. The system includes a processor and a memory operatively connected to the processor. The memory stores instructions which, when executed by the processor, cause the system to perform: extracting text from a check image to obtain check textual information; decoding an intelligent mail barcode (IMB) in the check image to obtain a character code; utilizing the character code to extract encoded check information including a payee ZIP code from the IMB; and performing a fraud detection process on the check image based on at least one of (1) scores generated during the text extraction process, or (2) inconsistency between the check textual information and the encoded check information.

Other aspects of the present disclosure are as provided below in conjunction with the embodiments provided.

DETAILED DESCRIPTION

Figure 1:
FIG. 1 illustrates an example environment in which aspects of the present disclosure may be implemented.

As briefly described above, embodiments of the present invention are directed to techniques for identifying and remediating anomalies in institutional financial instruments using image processing techniques. In particular, techniques for processing images are provided that leverage features specific to institutional financial instruments are described.

In examples, an image of an institutional financial instrument (e.g., an institutional check) may be processed by performing a text extraction process on a check image to obtain textual information of the check. The text extraction process may be performed, for example, using optical character recognition (OCR), learning models, or template matching processes. Additionally, an intelligent mail barcode (IMB) may be identified in the image, and recognized to obtain a character code. Image processing techniques may be performed on the IMB code to obtain a reliable image that may be decoded. The IMB code, when extracted and decoded, may allow for obtaining additional information about an intended recipient (e.g., a payee) of the institutional financial instrument, such as a ZIP code of an intended delivery address. That additional information may be used to identify anomalies.

When an institutional check is processed, common check features can be analyzed and obtained, including payee name, address, issue date, routing number, amount, and the like. Further, the IMB and/or 2D barcode are also processed to obtain additional information and/or perform additional verification. Other types of financial instruments, in addition to checks, that are issued by a governmental entity or other institution, may similarly have a machine-readable code, such as the IMB or 2D barcode. Additionally, often such financial instruments use highly regularized fonts for information, such as payee, account, amount, or other details, which are specific to the check that is issued to an individual. While technologies have evolved that are applicable across all types of checks to assist with check processing, traditional techniques do not leverage the unique features of institutional checks for use in data capture, fraud detection, and the resulting automated processing and clearance.

In some instances, a fraud detection process is performed based on the check image, and information extracted therefrom. The fraud detection process may be based on one or both of (1) scores generated during the text extraction process and (2) inconsistency between the check textual information and the encoded check information.

The processes and systems described herein have a number of advantages over traditional techniques. For example, by taking advantage of specific features of institutional financial instruments, such as a regularized font, regularized appearance, and machine-readable codes, improved processes for the identification of anomalies may be performed. Additionally, use of a machine-readable code, such as an intelligent mail barcode, which embeds mailing information about an intended recipient of the instrument, enables further validation that the holder of the instrument is the intended recipient. Accordingly, cross-validation of that code may assist with further fraud detection processes as described herein. Thus, the technology underlying the processing of institutional financial instruments can be improved using techniques described herein, such as by being better able to detect and remediate anomalous financial instruments that might be fraudulent than processing technologies that lack such techniques, such as by having lower false positive detection rates, higher true positive detection rates, and increased accuracy overall. Remediating the anomalous financial instrument can take any of a variety of forms depending on the circumstance. In an example, the financial instrument is given an additional level of screening or scrutiny to determine if the anomaly is innocent or malicious. The remediation can include denying processing of the instrument, flagging the entity that submitted the financial instrument for processing as being a potentially malicious actor, taking other actions, or combinations thereof.

Although techniques herein involve features present on institutional financial instruments, the improvements herein are not directed to financial activity itself. Rather, techniques herein are related to improvements to technology to detect and remediate fraudulent activity using those features. Further, a person of skill in the art will understand that this disclosure further includes descriptions of improvements to image processing techniques that benefit fraud detection technology.

I. Institutional Instrument Processing Environment and Features

By way of background, the generalized environment and underlying technology for processing an institutional financial instrument is described. The environment described herein relates specifically to processing of an institutional check, such as a check that is issued from a governmental entity (e.g., payments from various benefits programs, such as Social Security, Medicare/Medicaid, or various other state or federal programs). While the following examples and environmental description refer to processing of an institutional check, it is recognized that the techniques described herein may apply to other types of financial instruments. The improvements to technology described herein, therefore, are not limited to the use of features or institutional checks. Other instruments, such as deposit slips and the like, may include features that can be used by technology herein to improve the identification and remediation of anomalies that may be indicative of fraud. Reference to an institutional check is for convenience of discussion.

FIG. 1 illustrates an example environment 100 to which aspects of technology of the present disclosure can be applied. The example environment 100 is one in which an institution 20 issues a financial instrument, such as institutional check 30, to an intended recipient.

In the example shown, a user U wishes to redeem the institutional check 30, for example by depositing or redeeming the check for cash. In that instance, the user may utilize a user device 12, such as a mobile device, to capture an image of the institutional check 30 to initiate a remote check deposit process, for example using a mobile application made available for installation on the user device 12 by a deposit institution 50 (e.g., a bank) at which the user U may have a deposit account. Alternatively, the user U may initiate a transaction, such as a deposit or redemption of the check, at an automated teller machine 14, or may deposit the check either remotely or in person, in which case an image of the check may be captured at a scanner/imager 16. In all such instances, the processing of the image may be performed, in whole or in part, at the devices 12-16, or may be performed at a computing system owned or controlled by the deposit institution 50 (or a third party affiliated therewith).

In example implementations, computing devices associated with the user U or deposit institution may perform processing of one or more images of a check to extract check information, and to perform various validation and fraud processing processes. Details regarding such features are described in Parts II-IV below.

In some example implementations, processing of an image of an institutional check 30 may be performed in support of a settlement process occurring when user U deposits a check with deposit institution 50. In that instance, the deposit institution 50 may be required to extract relevant information from the check image and use that information to perform an electronic settlement process with an issuing institution, such as a government financial institution 60. The issuing institution is generally the financial institution holding the account on which the institutional check 30 is drawn. This may be a governmental institution that is directly related to a government entity 20 who issues the check 30, or may be associated there with (e.g., a financial institution managing accounts on behalf of the government entity 30).

In some examples, the information extracted from the check image may include the account number, routing number, check number, and amount. Other types of information may be extracted from the check as well, in particular in the context of an institutional check 30. For example, specific payee contact information, including a name, a ZIP code, and mailing address may be extracted as well.

In some examples, the settlement process may include a check clearance process in which a receiving financial institution sends the extracted check information to a clearinghouse or other intermediary, such as the Federal Reserve, that facilitates exchange of funds between institutions. Such a transfer of check information may be performed using an Automated Clearing House (ACH) transaction, or other electronic funds transfer transaction. The payor institution may receive the check information, verify details, and debits the relevant account, sending confirmation to the clearinghouse which is in turn forwarded to the deposit institution. The deposit institution 50 may confirm the deposit with the user U, e.g., via an electronic message indicating the same. One or more additional reconciliation or exception handling processes may also be performed between the deposit institution 50 and a payor institution such as the government financial institution 60, depending on the specific implementation.

While the user U is often also the intended recipient of the institutional check 30, in some instances the user U is not the intended recipient. Rather, user U may be a malicious actor that intercepted the institutional check 30 or stole it from the intended recipient. While the user U is in possession of the institutional check 30, the user U may modify physical characteristics of the institutional check 30 or modify an image of the institutional check 30 prior to providing the forged institutional check 30 for processing. For instance, the user U may modify the institutional check 30 (or an image thereof) to make it appear that user U is the intended recipient (e.g., by changing the name on the check) and thereby trick the deposit institution 50 into paying money to the user U rather than its intended recipient.

Interference by a malicious user U can be difficult to detect for a variety of reasons. In particular, it is difficult to infer the physical state of a check, let alone an original physical state of a modified check, based on an image alone (often provided by mobile devices controlled by the malicious users themselves). Further, the existing image processing pipeline for the check deposit process may degrade the quality of the image (e.g., by converting it to a pure black and white image or compressing the image), which can increase the difficulty in analyzing the image for evidence of manipulation. Further still, given the relative rarity of malicious actors compared to typical users, a poorly tuned anomaly detection system may cause unacceptably high false positive rates. Such false positive rates may be driven even higher by innocent damage to the institutional check (e.g., mail getting wet in the rain or crumpled in a bag) or by innocently poor quality photos of a check provided for mobile check deposit. All of these factors complicate the technology involved in processing. Technology described herein is relevant to addressing these technical shortcomings and provide enhanced detection and remediation of potentially fraudulent institutional checks 30.

Figure 2:
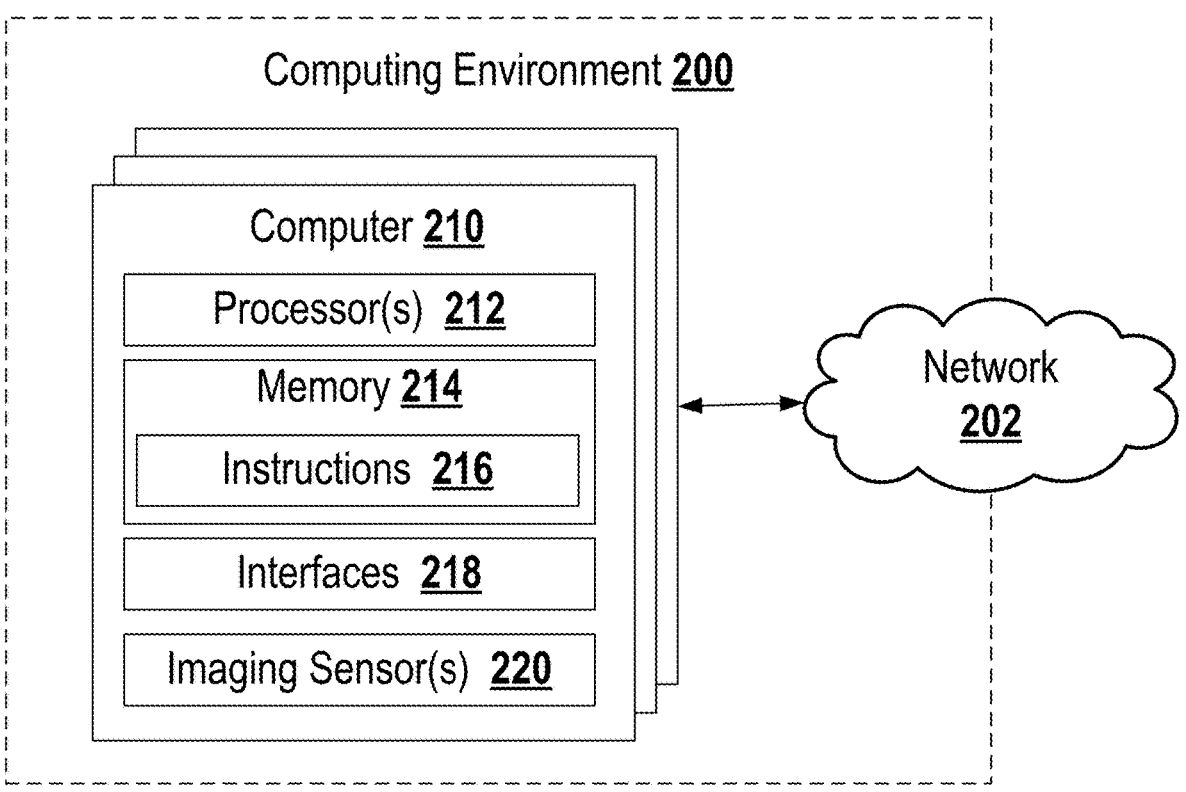
FIG. 2 illustrates a computing environment useable to implement methods of processing a financial instrument issued by an institution, in accordance with example aspects of the present disclosure.

FIG. 2 discloses a computing environment 200 in which aspects of the present disclosure may be implemented, in particular to implement methods of processing a financial instrument issued by an institution. A computing environment 200 is a set of one or more virtual or physical computers 210 that individually or in cooperation achieve tasks, such as implementing one or more aspects described herein. The computers 210 have components that cooperate to cause output based on input. Example computers 210 include desktops, servers, mobile devices smart (e.g., phones and laptops), wearables, virtual/augmented/expanded reality devices, spatial computing devices, virtualized devices, other computers, or combinations thereof. In particular example implementations, the computing environment 200 includes at least one physical computer.

The computing environment 200 may specifically be used to implement one or more aspects described herein. In some examples, one or more of the computers 210 may be implemented as a user device, such as mobile device and others of the computers 210 may be used to implement aspects of a machine learning framework useable to train and deploy models exposed to the mobile device or provide other functionality, such as through exposed application programming interfaces.

The computing environment 200 can be arranged in any of a variety of ways. The computers 210 can be local to or remote from other computers 210 of the environment 200. The computing environment 200 can include computers 210 arranged according to client-server models, peer-to-peer models, edge computing models, other models, or combinations thereof.

In many examples, the computers 210 are communicatively coupled with devices internal or external to the computing environment 200 via a network 202. The network 202 is a set of devices that facilitate communication from a sender to a destination, such as by implementing communication protocols. Example networks 202 include local area networks, wide area networks, intranets, or the Internet.

In some implementations, computers 210 can be general-purpose computing devices (e.g., consumer computing devices). In some instances, via hardware or software configuration, computers 210 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 210 include one or more processors 212, memory 214, and one or more interfaces 218. Such components can be virtual, physical, or combinations thereof.

The one or more processors 212 are components that execute instructions, such as instructions that obtain data, process the data, and provide output based on the processing. The one or more processors 212 often obtain instructions 216 and data stored in the memory 214. The one or more processors 212 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 212 include at least one physical processor implemented as an electrical circuit. Example providers processors 212 include INTEL, AMD, QUALCOMM, TEXAS INSTRUMENTS, and APPLE.

The memory 214 is a collection of components configured to store instructions 216 and data for later retrieval and use. The instructions 216 can, when executed by the one or more processors 212, cause execution of one or more operations that implement aspects described herein. In many examples, the memory 214 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 214 can store information encoded in transient signals.

The one or more interfaces 218 are components that facilitate receiving input from and providing output to something external to the computer 210, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 218 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1018 can facilitate connection of the computing environment 200 to a network 1090.

The computers 210 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, code, or other text, generate such text, including natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

In the example shown, one or more of the computing devices 210 may also include one or more image sensors 220. An image sensor 220 may be used to capture images, such as images of a financial instrument such as a check. Image sensors 220 useable within a computing system 210 may include a charge-coupled device (CCD) sensor, CMOS sensor, and the like. It is noted that images captured by an image sensor 220 of a particular computing system 210 (e.g., by any of devices 12-16 of FIG. 1) may be processed by another computing system within the overall environment 100.

Figure 3:
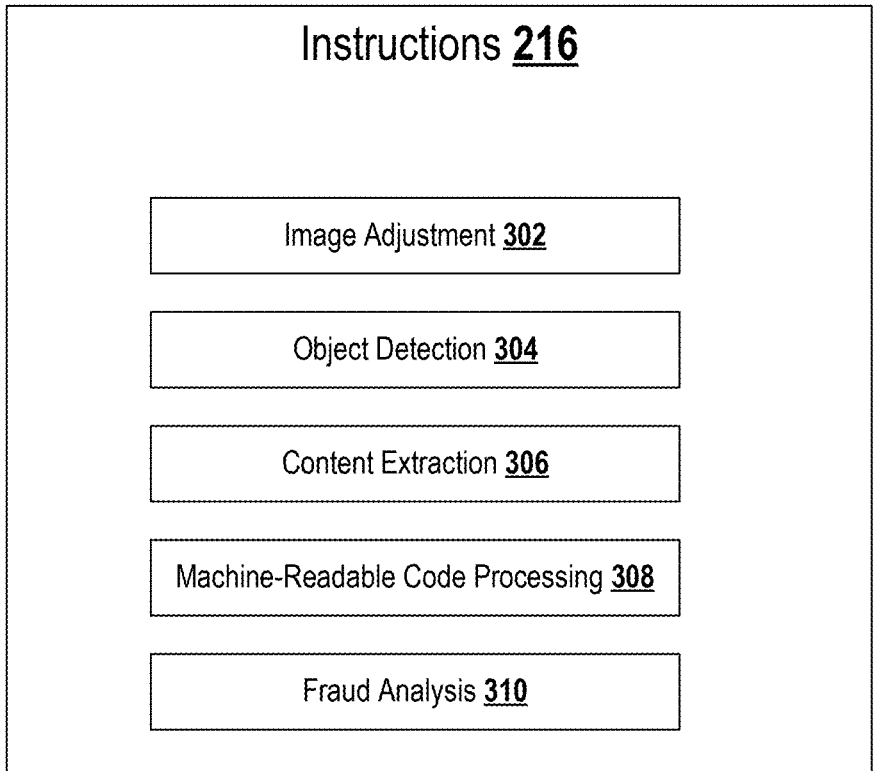
FIG. 3 illustrates a set of instructions executable to perform processing of a financial instrument issued by an institution at a computing system, in accordance with example aspects of the present disclosure.

FIG. 3 illustrates a set of instructions 216 that may be stored in the memory 214 of one or more of the computing devices 210 described in FIG. 2. The instructions 216 may be executable to perform processing of a financial instrument issued by an institution at a computing system including one or more such devices. In the example shown, the instructions 216 include image adjustment instructions 302, object detection instructions 304, content extraction instructions 306, machine-readable code processing instructions 308, and fraud analysis instructions 310.

In some examples, image adjustment instructions 302 may include instructions to preprocess an image before check data is to be extracted. The image adjustment instructions 302 may include instructions for performing one or more of tilt and de-skew operations, as well as one or more de-noising steps. The image adjustment instructions 302 may also include instructions for performing an analysis across a plurality of images to determine an image of a check having an appropriate size ratio. For example, a received image may be duplicated in larger and smaller sizes, for example to create an image of appropriate size for processing. The different sizes of images, once de-noised, tilted, and de-skewed, can be compared against a plurality of templates that correspond to known institutional checks.

In some examples, the object detection instructions 304 may be executable to detect recognizable objects within an image of an institutional check. Recognizable objects may include a region of the check that contains a machine-readable code, a region of the check that contains payee address information, a region of the check that contains pay or account and routing information, a region of the check that contains the check number and date of the check, or other types of data fields.

In some examples, the content extraction instructions 306 may be executable to extract information from the check image, for example text information printed on the face of the check. In such examples, a variety of techniques may be used. In one instance, an optical character recognition (OCR) process may be performed on the image of a front side of the check. In an alternative example, one or more machine learning models may be used to extract data from the front side image of the check. In a particular example as described herein, a pattern matching process may be performed that matches templates of characters to regions of the image in order to identify a character appearing in the image, as well as a position of that character. Details of such a process are provided in Part II, below.

In some examples, the machine-readable code processing instructions 308 may be executable to isolate a region of a check image including a machine-readable code, and to process the machine-readable code to enhance its readability. Additionally, the machine-readable code processing instructions 308 may be executable to obtain an alphanumeric code that is represented by the machine-readable code, and to use the alphanumeric code to obtain particular information about the intended recipient of the institutional check. In some instances, such information may include a ZIP code or other address or routing information of the intended recipient, which may be usable to validate the recipient when the check is presented for deposit. Details of a process for enhancing the readability of a machine-readable code and extracting information from the machine-readable code are provided in Part III, below.

In some examples, the fraud analysis instructions 310 may be executable to determine a likelihood of fraud based on characteristics of the image, and in particular characteristics indicative of potential tampering with an institutional check being presented for deposit. In examples, the fraud analysis instructions may include instructions for comparing information extracted from a machine-readable code via the machine-readable code processing instructions 308 to information obtained via the content extraction instructions 306. In other examples, the fraud analysis instructions 310 may include comparing regions of the image data, such as individual characters or character strings, to template characters or character strings, and analyzing a match score that represents the closeness of the comparison. In some instances, a match score below a threshold indicates a less than acceptable match, which may indicate a modification to the institutional check to change one or more numbers or characters displayed on the check may have occurred. Further details regarding processes usable as part of a fraud analysis are described in Part IV, below.

Figure 4A:
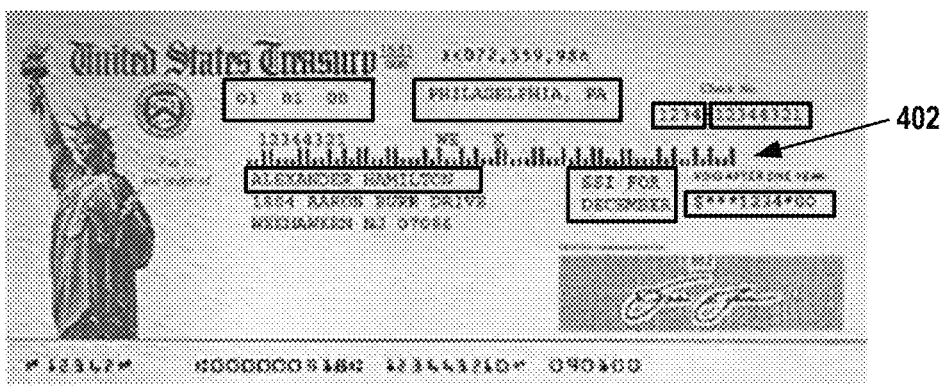
FIG. 4A illustrates an example institutional check that may be processed in accordance with the present disclosure.
Figure 4A:

FIG. 4A illustrates an example image of an institutional check (seen as check image 400) that may be processed in accordance with the present disclosure. In the example shown, the check image 400 represents a check drawn on the U.S. Treasury, for example the branch in Philadelphia, Pennsylvania. In the example shown, the check image includes text data, including a date, issue location, check number, payee and payee address, notes field, and amount. In the example shown, each of these is a region that is outlined by a square box, indicating that it is an item of interest when processing an institutional check. In addition, other text information may be presented on the check, such as in the magnetic character (MICR) line. This information, such as a routing number and account number, check digit, federal agency code, and issue date, may be, but may not be required to be, processed. Additionally, a signature area on the check (seen in the lower right corner) may have a signature, but because this signature is often printed and not necessary to prove validity of the check, it may be ignored when processing the check image 400. This is notably different from the manner of processing a personal check, in which validation of the routing and check number, and payor name/signature, has significantly greater importance when processing such a personal check.

In the example shown, the check image 400 includes an intelligent mail barcode (IMB) 402, shown as a series of vertical lines of varying heights. The IMB 402 represents a set of encoded characters, typically made up of 65 vertical bars of a set of known formats, which may be used to represent alphanumeric characters. In particular, a combination of "full" height bars, descending bars, ascending bars, and track bars, may be recognized to obtain a string of 65 characters, selected from among the characters F, D, A, and T, respectively. A decoding key used to translate the IMB 402 to the set of 65 characters is presented in Table 1, below.

TABLE 1

| Key | | Description |
| --- | --- | --- |
| F | ǁᴵᵇ | Full Bar |
| D | ʰᶦᵇ | Descending Bar |
| A | ǁᶜᵗ | Ascending Bar |
| T | ǁᵗᵇ | Track Bar |

In example uses, the string of 65 characters, e.g., "TADD-AFFAFTTFTDTDFAATFFFTATFDDTFFATTAFDTF-FADDTTFTAFTFFFTAAADDTFA AA", or the like, may be translated into a set of numerical digits according to a set of predefined rules. The numerical digits include a mailer ID and a delivery point ZIP code, as well as various other mail routing information, such as a tracking code, a routing code, a barcode identifier, and a serial number. The IMB 402 may be useable to quickly identify a routing of an item in the mail, and is used on such institutional checks to help route them to an intended recipient through U.S. postal handling systems. However, historically, the IMB 402 is not used for check processing itself.

Figure 4B:
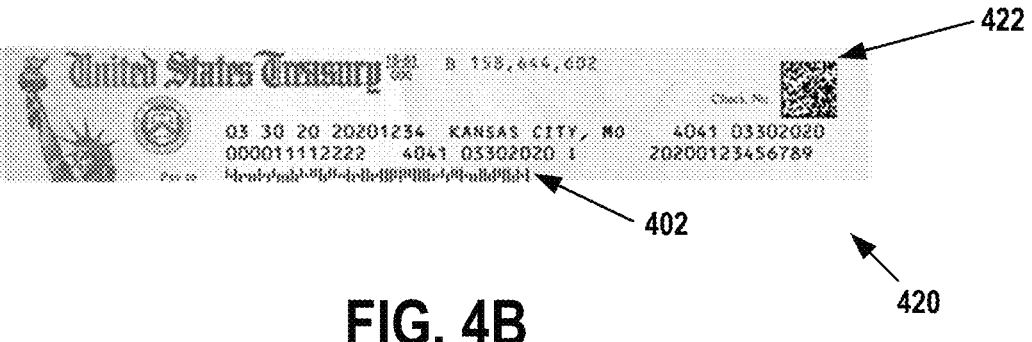
FIG. 4B illustrates a portion of an alternative example of an institutional check.

FIG. 4B illustrates a portion of a check image 420 representing an alternative example of an institutional check. In this example, a two-dimensional code 422 is displayed in the check image, and is printed on the physical check. The two-dimensional code 422 may embed a check serial number, in example embodiments. In this example, the two-dimensional code 422 is presented alongside IMB 402.

As discussed further below, example implementations of check image processing systems may utilize the IMB 402 and other check information, including optionally the two-dimensional code 422 or text information that may be extracted from a check image, to process the check and perform one or more fraud detection processes on the check image. The techniques improve reliability of check deposit, because the IMB 402 may be read and validated during the check processing process, and compared against other information known about the payee (e.g., based on the information printed on the check). Furthermore, because the check images 400, 420 of FIGS. 4A-4B, and institutional checks generally, utilize a common font, various character analysis processes may be performed to detect possible tampering or other problems with the institutional check.

Furthermore, and by contrast to the approach for processing institutional checks, and by way of reference, a personal check may include print information, such as a payor name and address, a date line, a check number, a memo line, a signature line, a dollar amount, and a check number. A personal check may also include various pre-printed information, including a routing and account number printed along a lower edge of the check in a magnetic ink character (MICR) line. In some example embodiments of the present disclosure, an institutional check may be processed with limited or no reference to a signature line and/or a MICR line. That is, a signature line may have lower relevance in the context of an institutional check, and MICR information (account and routing information) may be either inapplicable or represented elsewhere on the check in a more secure manner. As such, the techniques described herein may be used without processing a MICR line, and/or in circumstances where a MICR line and/or signature may be absent.

IL. Institutional Instrument Processing Methods

Referring to FIGS. 5-9, a general approach for processing institutional instruments, such as institutional checks, is described. The processes described herein are useable to leverage features of an institutional check that appear in images of such checks, thereby enabling a broad range of mobile, ATM, or institutional deposit processes to utilize the techniques described.

Figure 5:
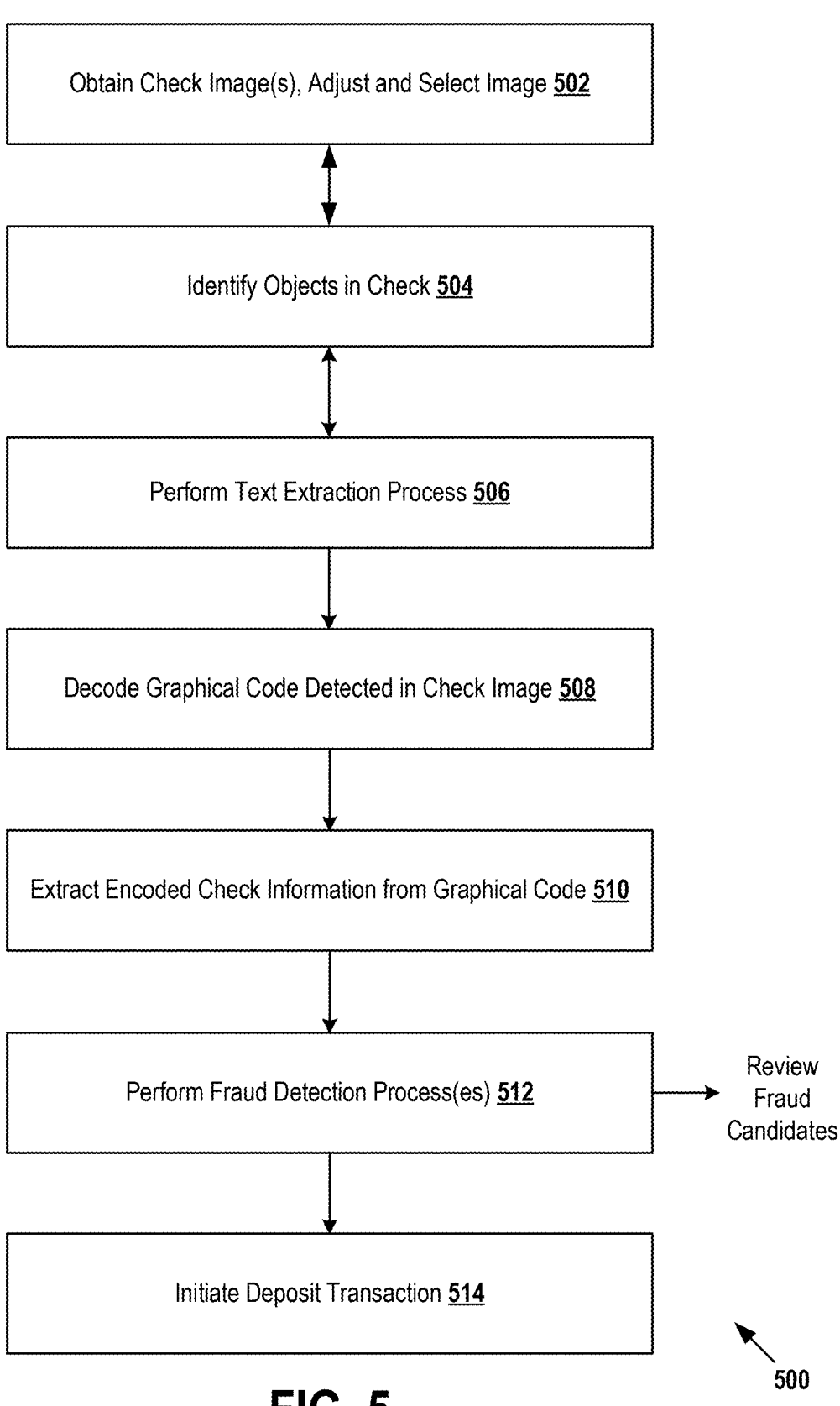
FIG. 5 illustrates a flowchart of a method of processing an institutional financial instrument in accordance with the present disclosure.

FIG. 5 illustrates a flowchart of a method 500 of processing an institutional financial instrument in accordance with the present disclosure. The method 500 may be performed, in whole or in part, by any of the devices 12-16, or at a computing system affiliated with the deposit institution 50. In the example shown, the method 500 includes steps 502-512.

In the example shown, the method 500 includes a check image receipt and adjustment process (step 502). In examples, the check image receipt and adjustment process includes analyzing the check image and performing one or more image adjustment processes, such as one or more tilt or de-skew processes, as well as applying one or more types of noise filters to the image data. Once adjusted, the adjustment process may include a resizing process as well, which includes creating a plurality of versions of a check image that is received for processing at different sizes. For example, a check image may be scaled and copies are made at size ratios including, for example, 0.85, 0.9, 0.95, 1.0 (unscaled, original size), 1.05, 1.1, and 1.15. Other scaling may be used as well in other embodiments.

In the example shown, the method 500 includes identifying objects in the institutional check (step 504). In examples, identifying objects in the institutional check may include identifying regions, such as those shown in FIGS. 4A-4B, that may contain relevant text and/or a machine-readable code. This may be performed on each of the scaled versions of the image that are generated after image adjustment.

In the example shown, the method 500 also includes performing a text extraction process (step 506). In some cases, the text extraction process may be used to obtain check textual information (e.g., information printed on the check). The text extraction process may be performed in a number of ways.

In some embodiments, the identification and extraction of content is performed using one or more techniques described in U.S. patent application Ser. No. 18/357,655, which was filed Jul. 27, 2023, and which is incorporated herein by reference in its entirety for any and all purposes.

In one embodiment, an open source or commercial optical character recognition (OCR) tool may be used, such as the tesseract-ocr optical character recognition engine which is made available by GOOGLE of Mountain View, California.

In a second embodiment, a deep learning approach may be used to extract key information from a check image. In this approach, a set of trained models, such as a convolutional neural network (CNN) or recurrent neural network (RNN), or hybrids thereof, may be trained on an annotated dataset to identify and locate alphanumeric characters in an image. This may enable the model to identify and isolate portions of a check image that contain relevant data, and predict/identify characters within relevant regions of the image. Various preprocessing steps (e.g., grayscale conversion, resizing, normalization) and postprocessing (noise suppression and error correction) may be included in such a process as well.

Figure 8:
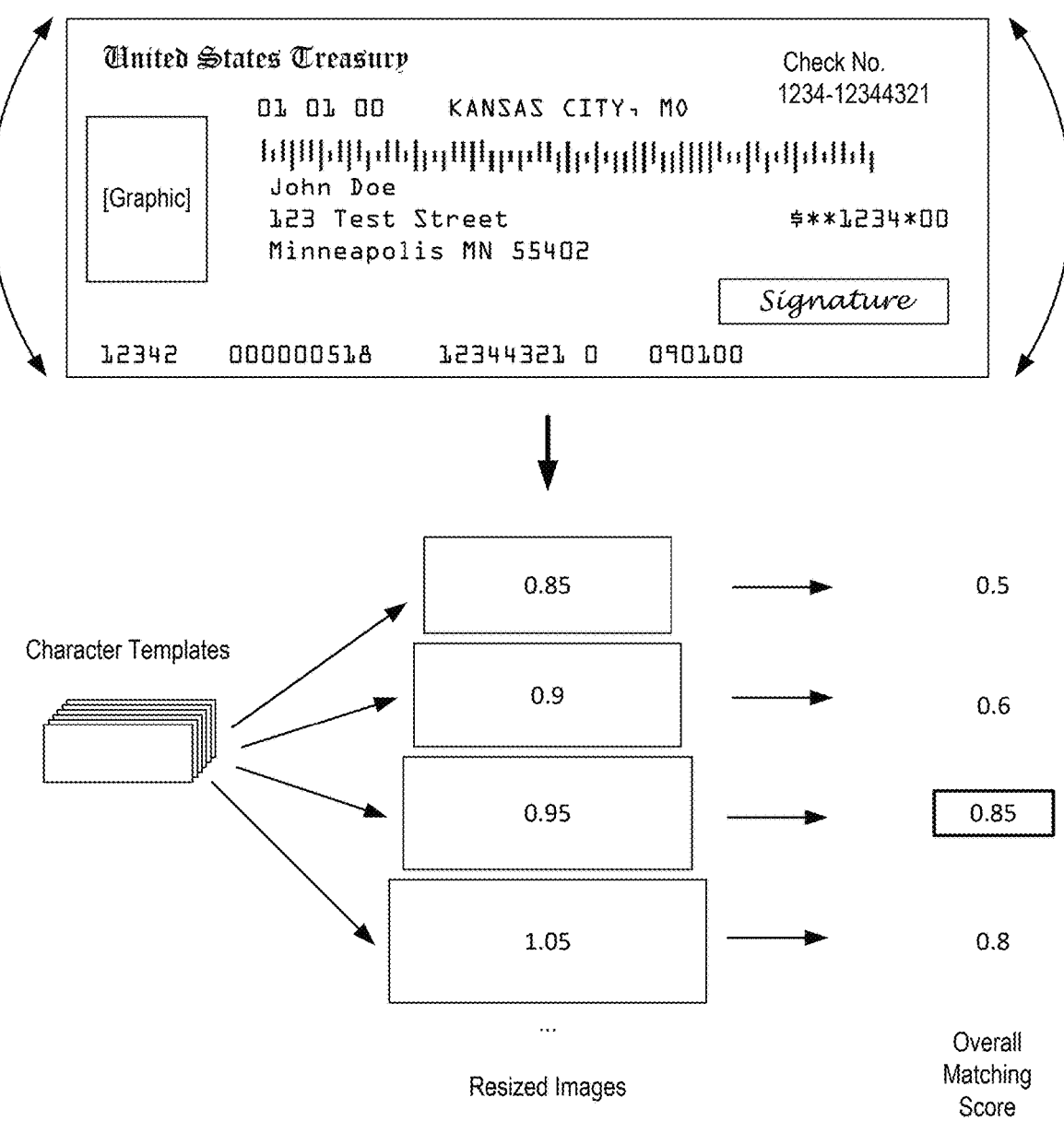
FIG. 8 is a schematic diagram illustrating a template matching process for identifying an appropriate image and institutional check template useable for processing image regions of a check image.
Figure 9:
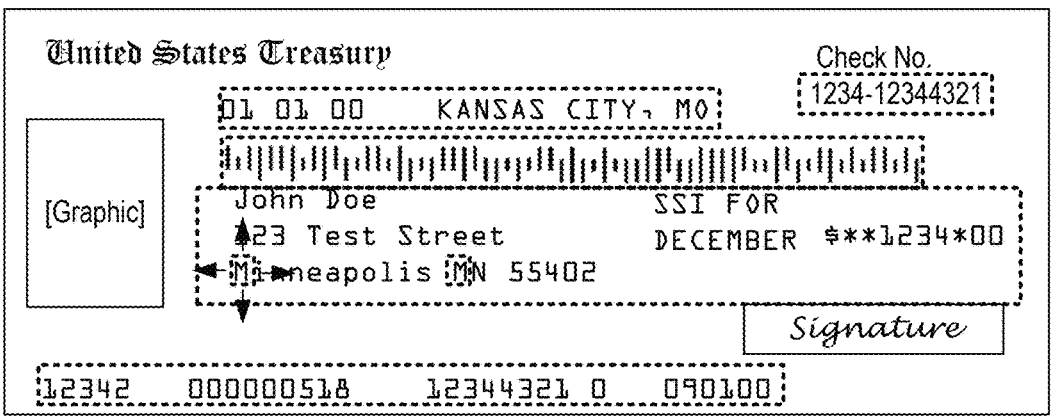
FIG. 9 is a schematic diagram illustrating a template matching process for determining the identity and location of characters within an image or portion thereof, in accordance with example implementations.
Figure 9:
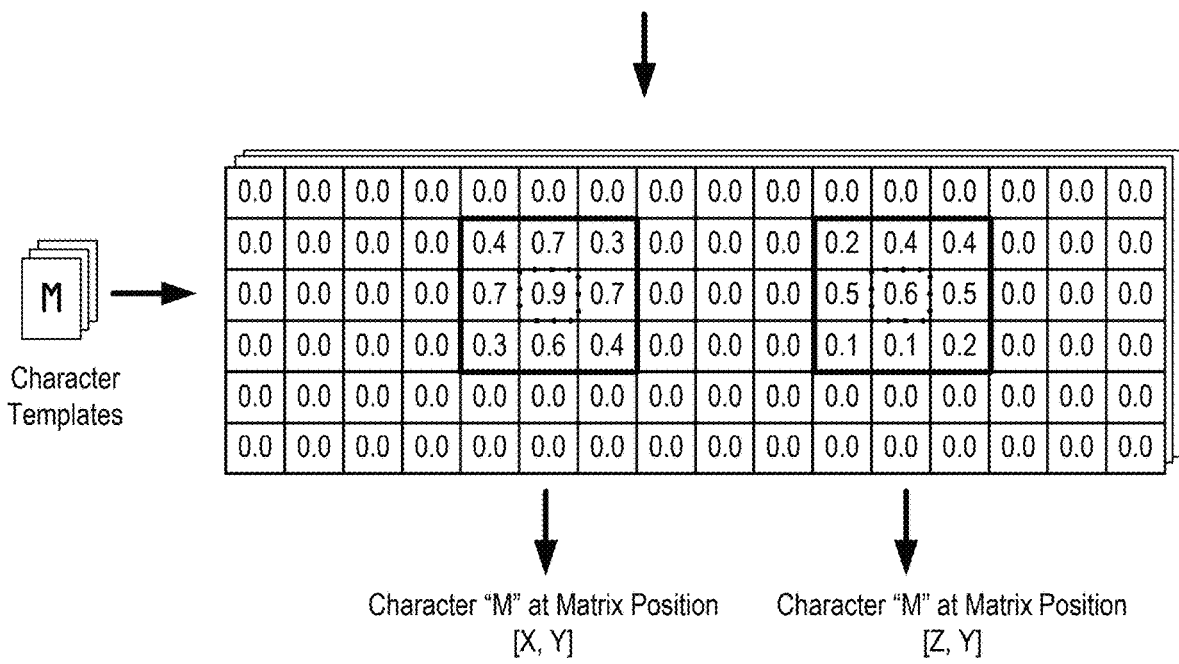

In a third embodiment, a template matching process may be used. The template matching process is described in further detail in FIGS. 7-8, below, but generally involves extracting patches of relevant information from the check and performing a character template match for each of a plurality of alphanumeric characters having a predetermined font that is the same as the one used in institutional checks (e.g., the OCR-A font as seen in FIGS. 8-9, or the OCR-B font, for example). In general terms, the template matching will result in a set of matching scores for a given character, with a highest matching score representing a position at which the character may be located within the patch. The matching scores may be normalized scores between 0 and 1, and higher scores representing a better match. Matching scores may be determined for each possible pixel or character position, with a template for each possible alphanumeric character compared against each possible character position in a patch. A 2D matrix of matching scores may be generated representing the possible positions of that character, and a clustering analysis may be performed to find local maximum matching scores which may represent positions of that character within the patch or document.

In examples, the matching score-based process may be performed across each of the resized images, and an overall matching score, which may be representative of a highest or average maximum matching score, may be extrapolated from the overall matching score process. The highest overall matching score across all characters may correspond to the sized image of the check that best matches the templates that are used, and as such can identify the appropriate one of the original or resized images to be used in obtaining the template matching results and otherwise performing the further image analysis (e.g., analysis of the machine-readable code and performing fraud detection processes, described below).

It is noted that in some instances, although there may exist a matching score that is highest among each of the templates when compared against each size of the institutional check image, in some instances this nevertheless does not mean that a match exists. Rather, the match score should exceed a predetermined threshold. If a plurality of templates match the same image and image size, and are above the matching threshold, a highest scoring template may be selected, or a highest scoring X number of templates may be processed in parallel to determine a best match of a size of the image.

In some instances as well, the resizing may be selected to only occur after an initial template matching is performed. For example, if a template matching results in an overall document matching score that is below a predetermined threshold score, the resizing may be performed in an attempt to iterate on the template matching process using differently sized images to obtain a better overall document matching score. Accordingly, the steps 502-506 may be performed iteratively and/or out of order to obtain a best matching set of characters. The extracted text may be analyzed and its meaning categorized based on content, or may be assigned to particular meanings based on an analysis of the position or patch from which the text is extracted. For example, a payee name and address is typically in a similar position across different institutional checks, an amount is similarly in a known position on an institutional check, and so on. The template matching, and overall image manipulation processes, are described in further detail below in conjunction with FIGS. 6-9.

In the example shown, the method 500 includes decoding a graphical code that is detected in the check image (step 508). In some cases, the graphical code may be an intelligent mail barcode (IMB) that is included in the check image, and decoding the graphical code involves obtaining a character code from the IMB. Once an image of the check is selected as noted above, including the appropriate sizing ratio, a region of the check including the IMB may be located and isolated. Specifically, the check image may be preprocessed, for example to apply one or more image enhancement processes, such as tilt fixing, noise removal, and the like, as noted above. The check image may be matched against a template having periodic structures that are analogous to the IMB, e.g., having a central portion with a frequency of 65 in which each period consists of a central track bar region and related white space, to identify the location of the IMB within the check image. To enhance a captured IMB image, a series of steps including horizontal dilation, masking, and erosion are performed prior to decoding the vertical bar positions to obtain a character code. Additionally, pixel density of regions of the vertical bars may be analyzed, after image enhancement, to detect and ignore any lingering noise.

In the example shown, the method 500 includes extracting encoded to check information from the graphical code (step 510). This may be performed, for example, by using the character code obtained from the graphical code, and extracting encoded check information from it including at least a payee ZIP code, and other IMB-embedded information as noted above.

In the example shown, the method 500 includes performing a fraud detection process or processes (step 512). The fraud detection process may be based on scores generated during the text extraction process. In further examples, the fraud detection process may be based on an inconsistency between the check contextual information and encoded check information obtained from the graphical code. As discussed below, this may be a comparison between a payee ZIP code included in the graphical code and a payee ZIP code extracted from printed text in the check image. Details regarding the fraud detection process, in example embodiments, are provided in Part IV.

Based on the fraud detection processes of step 512, in some instances, any potentially fraudulent check image candidates may be forwarded to a further service or entity for further review. However, if fraud detection processes are completed successfully without identifying risk of fraud, an automatic deposit transaction or other transaction to process the institutional check may be performed (step 514). That is, the information extracted from the check is considered reliable, and may be used in an automated check deposit or cashing process based on the data extracted from the check image.

Figure 6:
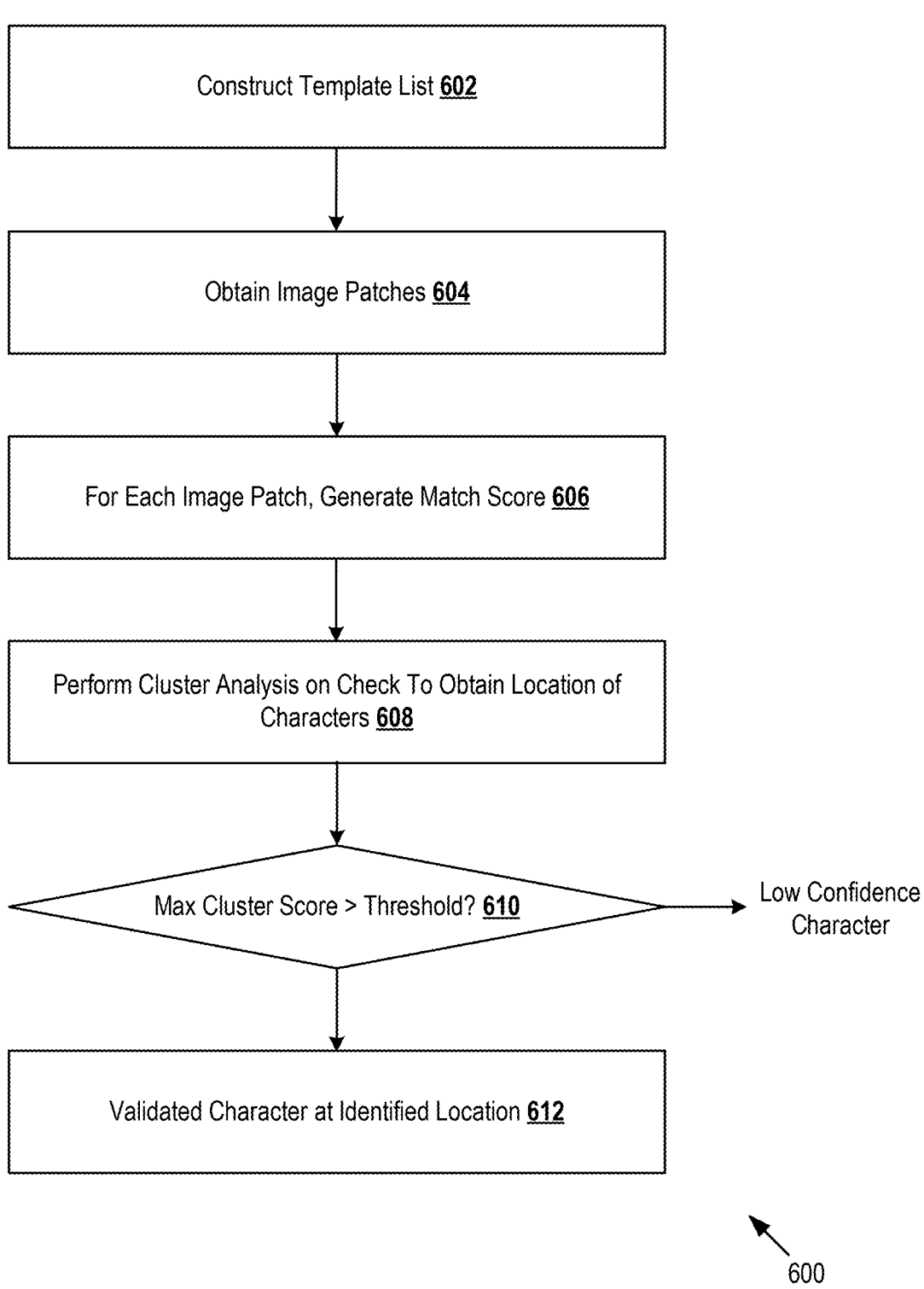
FIG. 6 illustrates a flowchart of an example template matching process for character matching.

FIG. 6 illustrates a flowchart of a method 600 of performing an example template matching process for character matching. The method 600 represents one possible way in which step 506 of FIG. 5 may be accomplished using character-by-character template matching. The method 600 includes steps 602-612.

In this example as shown, the method 600 includes constructing a template list of alphanumeric characters that may appear in an institutional check and are to be detected (step 602). The template list may include a set of letters A-Z, digits 0-9, and common symbols, e.g., %,-, $, &,/, and *. Since letters, digits, and symbols have generally unform fonts and sizes in institutional images, the template may be represented by a 2D array with dimensions of about 36×30 pixels (e.g., using Python). By comparison, an institutional check image may be modeled as a 2D array having dimensions of about 975×2213, when sized using 300 dots per inch (dpi).

In the example shown, the method 600 optionally includes obtaining image portions of interest from the check image (step 604). In alternative arrangements, the entire check image array may be matched against each individual template to generate match scores, and may be considered the portion of interest.

In the example shown, the method 600 includes generating match scores for every character in every possible patch position within the image (step 606). A patch position within the image corresponds to a similar 36×30 array from the image array of 975×2213, and the pixel values in that patch are compared against a template image to obtain a match score. This involves constructing a 2D array of match scores and performing an image-to-image comparison of the templated character against the patch in a particular position that might correspond to that character. In this case, an overall template matching results in a 2D array having dimensions of about 940×2184, which corresponds to the number of unique possible positions within the check image for a given character. That is, the 940 possible positions are obtained from the size of the check image (975) minus the size of the template (36) plus one additional possible position. Similarly, 2184 is based on 2213−30+1. Separate matching templates are created for each character, so separate matching arrays of 940×2184 are generated for each possible character.

In the example shown, a cluster analysis is then performed to obtain a location of characters within the check image (step 608). The cluster analysis finds any local maxima within the matching arrays, such that as each patch is compared to a template, match scores in adjacent positions that may be non-zero are not considered to be overlapping positions of the same character. However, two spaced apart local maxima for matching scores may be considered two different instances of the same character (see, e.g., FIG. 9).

In the example shown, a comparison operation 610 is performed to determine if a maximum score within a given cluster exceeds a matching threshold. If the score exceeds a threshold, it can be assessed that there is a character match. However, if the score does not exceed a threshold, a match may not be reliable. This may be for a number of reasons. For example, a given character may have a lower match score based on a match between appearance of two characters—e.g., a template for the character "1" may be a reasonable match for the lowercase letter "l" (L), and the like. In this instance, it may be that only the lowercase "l" template meets a threshold match score. Or, the threshold match score may be selected to choose from among the various characters, such that only the maximum match score is selected. In that way, the same position is not considered to correspond to both the number "1" and the letter "l" despite both having local maxima match scores in the same position; only a highest match score character is selected, with the lower confidence match score character not being selected as being located at that position.

In a specific example, one location may be matched to the letter I, but another location which is only a few of pixels away from the previous location either horizontally or vertically is matched to the digit 1. For example, a patch whose top left corner is located at [431, 617] is matched to the letter I with a match score of 0.6952. A second patch whose top left corner is located at [431, 624] is matched to the letter L with a matching score 0.6789. A third patch whose top left corner is located at [431, 618] is matched to the digit 1 with a matching score 0.7279. Since each patch has dimensions 36×30, the three highly overlapped patches must represent one and only one item out of the three templates I, L, and 1. To systematically handle the situation where overlapped patches match with similar but different templates, the spatial cluster analysis is used to separate the patches into different clusters. In each cluster, the template and the precise location of the patch are determined by the highest matching score. In the above example, the digit 1 is determined as the final matched template as it has the highest matching score. Correspondingly, the precise location of the patch starts at [431, 618]. Positions of the possible I and L matches are then discarded.

Referring to FIG. 6 generally, it is noted that this match score process may be performed on each of the resized check images to determine a best fit for a maximum number of characters. The best fit image size may be based on the number of characters identified in the image using the matching process, the overall maximum match score average, or some other metric.

Figure 7:
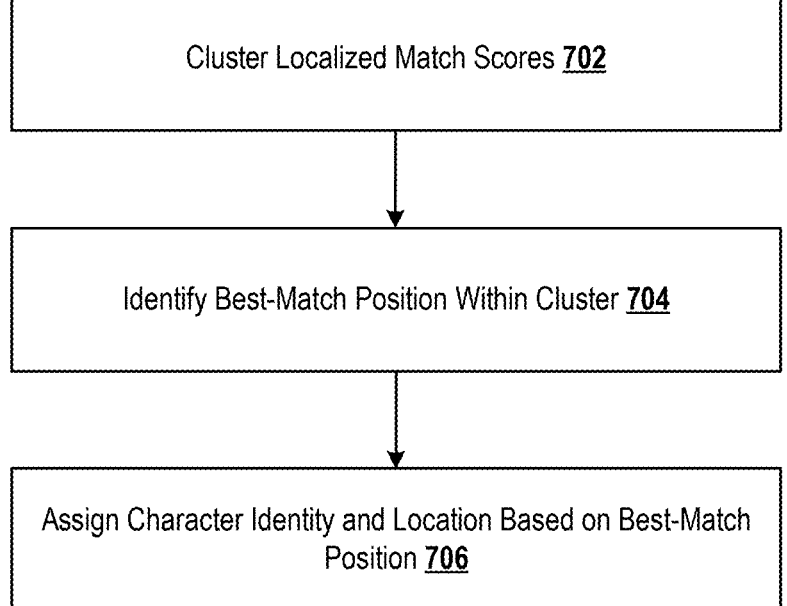
FIG. 7 illustrates a flowchart of a method of performing cluster analysis within the template matching process of FIG. 6 to determine an identity and location of a character within an image, in accordance with example implementations.

FIG. 7 illustrates a flowchart of a method 700 of performing cluster analysis within the template matching process of FIG. 6 to determine an identity and location of a character within an image, in accordance with example implementations. The method 700 of performing a cluster analysis may be used, for example, to accomplish step 608 of the template matching process of FIG. 6. The method 700 includes steps 702-706.

In the example shown, the method 700 includes clustering localized match scores within the match score array (step 702). Clustering the localized match score arrays involves identifying local maxima within the overall match score array. This may include any potential match scores that correspond to pixel positions offset from one another vertically or horizontally. The method 700 further includes identifying a best-match position within the cluster (step 704). The best-match position for that character is based on the local maxima within the cluster. For example, in an image with two "M" characters (see FIG. 9) there may be two local maxima, with lower match scores surrounding those characters. The local maxima in the match score array corresponding to the template "M" will then be able to be used to assign two specific positions for the character "M" within the check image.

The method further includes assigning a character identity and location based on the best-match position for each character (step 706). The assignment of the character identity and location is based on the best-match positions for each character, and ensuring that no two characters are assigned to the same position, as noted above. That is, the local maxima described above for the character "M" may be selected and identified for those characters, and if any other character template has a match score in an overlapping position, the match scores are compared to select the one of the two characters that represents a best match. In the example using the digit 1 and the letter I, match scores may more likely overlap in the same position, and as such only one of those characters will be selected based on which has a higher match score.

Now referring to FIGS. 8-9, schematic diagrams 800, 900, respectively, are shown illustrating the overall content extraction process using image adjustment, resizing, and template matching and clustering to extract textual data from the institutional check image.

FIG. 8 illustrates an initial image manipulation process, corresponding generally to portions of steps 502-506. In particular, a tilt, deskew, and denoise process is performed on a check image (a schematic version of which is depicted), and a plurality of resized check images are generated in different size ratios. Additionally, as illustrated in FIG. 8, an overall matching score may be used after a template matching process is performed to select the best match one of the original or resized check images to be used for subsequent processing. In the example shown, an overall match score for a check image resized at 0.95 size ratio is selected; the overall match score may be average match scores of local maxima, or some similar metric.

In various embodiments, the overall matching score may be selected or determined from individual matching scores. For example, the top N (e.g., top 30-50) template matching scores may be collected and summed, and the size of image is selected that has the best overall matching score. In some instances, the top template matching scores are selected from among matched characters within a particular region of the check image, specifically sensitive or highest-priority data such as payee name, payee address, and issue amount.

In the diagram 900 of FIG. 9, the template matching process is shown in which either an entire check image, or regions of a check, may be matched against character templates. In this arrangement, separate character templates are provided for each character to be matched, and match scores are calculated in a 2D array for each possible position of the character within the check image or region of the check image. In the example shown, a character template "M" is matched in two example patches of the check image that are spaced apart from one another. A cluster of match scores is created in each region to include all scores above a predetermined, tunable threshold score, and a local maximum score is selected as a possible candidate patch position for that character.

Once match scores for each character are calculated, patch positions and character identity may be assigned. As noted above, a single character is assigned to a given position within the check image, so if there are overlapping positions of more than one character within the image, a character corresponding to a maximum match score may be selected. Additionally, in some instances, an absolute threshold may be selected such that even if a local maximum match score is not overlapping with the position of another character it may still be considered an unreliable match. In the example shown, the "M" character has two local maxima, with match scores of 0.9 and 0.6. If a threshold of 0.5 is selected, both character locations may be recognized. However, if a higher (e.g., 0.7) threshold is selected as an absolute threshold, only one character location may be recognized and assigned. It is noted that the absolute match score threshold may be adjustable as well, and tuned in conjunction with image sizing until recognizable character extraction is observed.

III. Intelligent Mail Barcode (IMB) Processing

Figure 10:
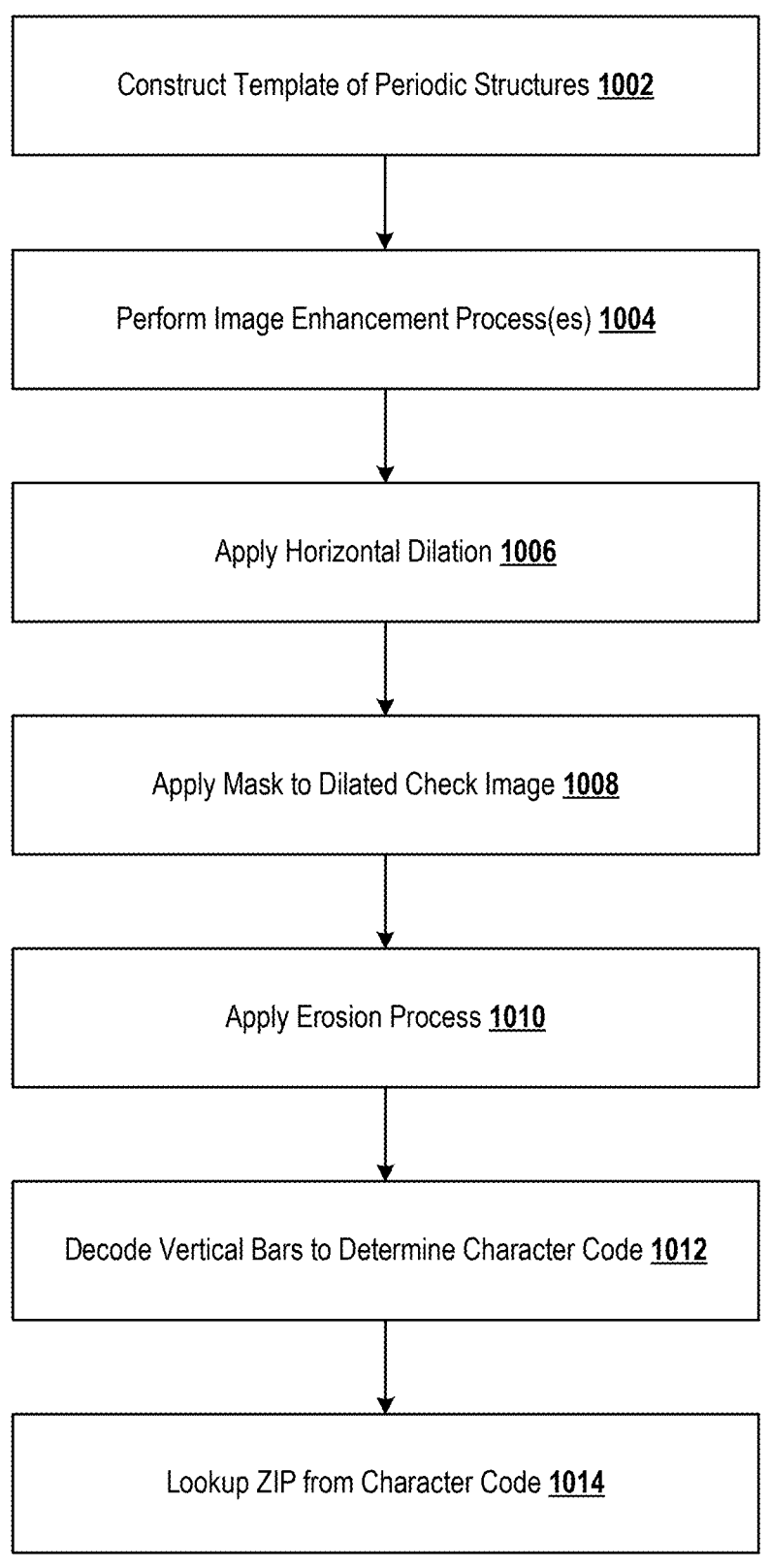
FIG. 10 is a flowchart of a method of processing a machine-readable code, such as an intelligent mail barcode (IMB), to obtain routing information presented in machine-readable form on an institutional check.
Figure 11:
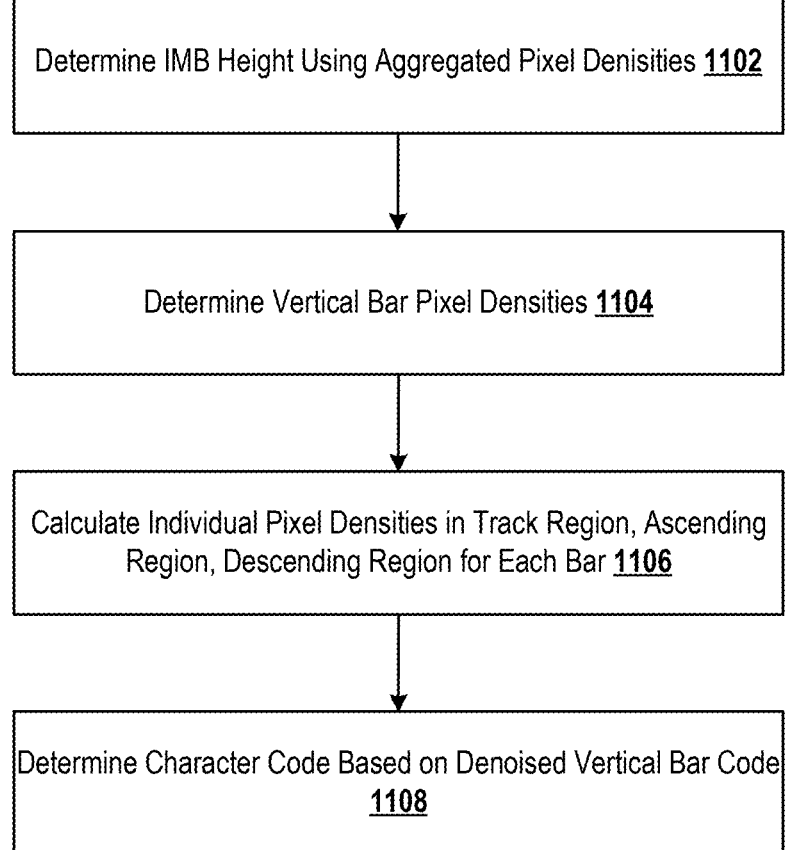
FIG. 11 is a flowchart of a method of decoding a processed IMB code to obtain payee address information, in accordance with example aspects of the present disclosure.
Figure 12:
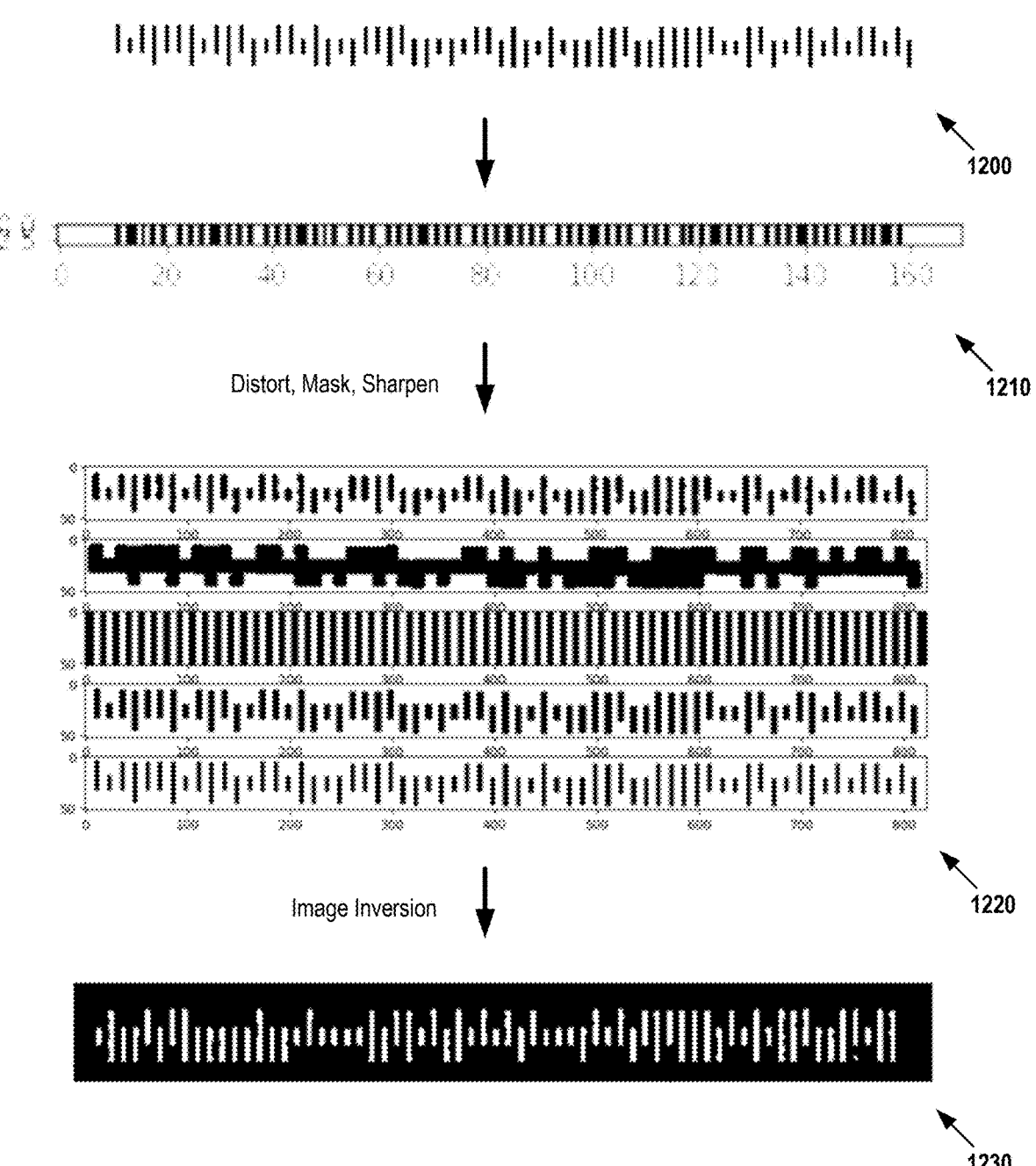
FIG. 12 illustrates a series of image processing steps performed on an IMB code in accordance with the method of FIGS. 10-11.
Figure 13:
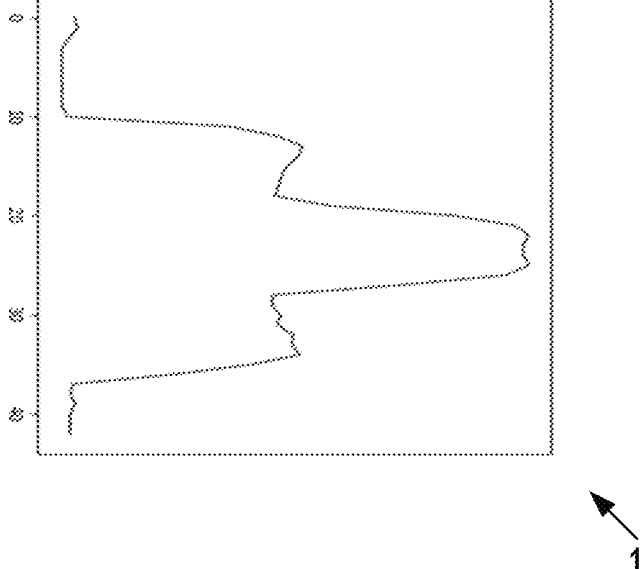
FIG. 13 illustrates pixel density analyses performed as part of a denoising process useable in obtaining payee address information from a processed IMB code.
Figure 13:
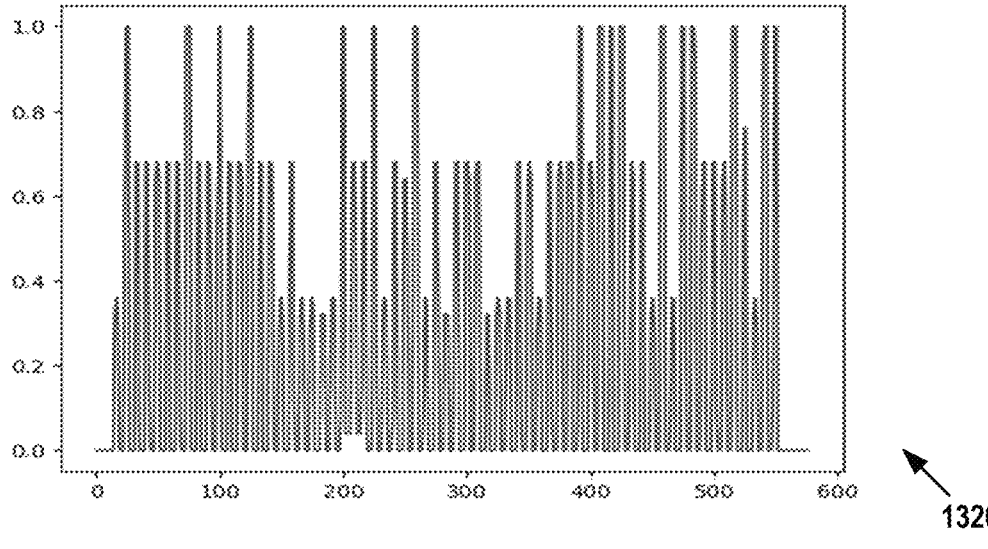
Figure 14:
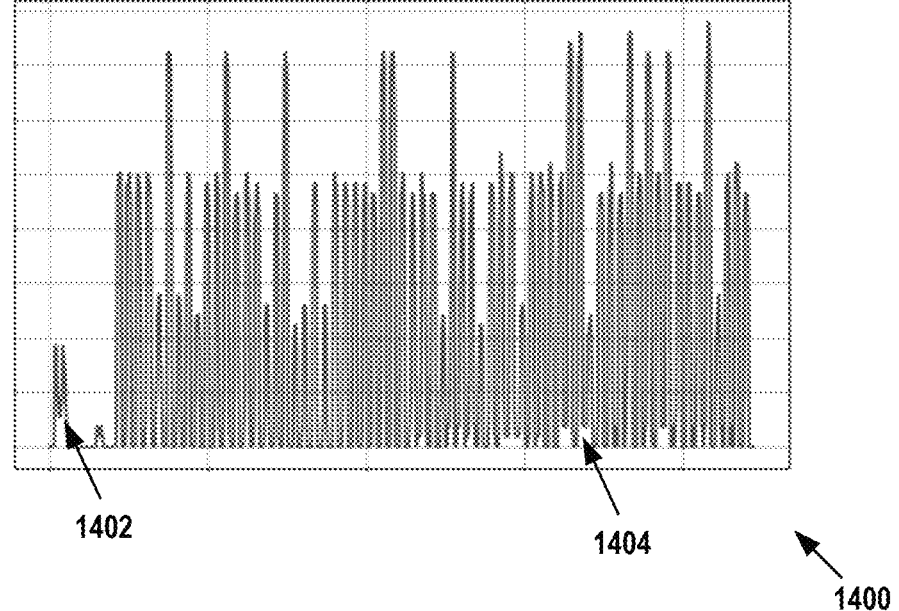
FIG. 14 illustrates a further pixel density analysis performed as part of a denoising process useable in obtaining payee address information from a processed IMB code.

Referring now to FIGS. 10-14, techniques for processing a machine-readable code, such as an intelligent mail barcode (IMB) are described. The intelligent mail barcode may be decoded to obtain additional information about the institutional check, for example for comparison against extracted character data described above. Example processes are described in FIGS. 10-11, with image processing steps referenced therewith as depicted in FIGS. 12-14.

Specifically, FIG. 10 illustrates a flowchart of a method 1000 of processing a machine-readable code, such as an IMB, to obtain routing information that is presented on the check image in a machine-readable form. An example IMB is illustrated as IMB 1200 of FIG. 12. The method 1000 may be performed in conjunction with the content extraction processes described above, for example using any of the devices described in Part I.

The method 1000 includes constructing a template of periodic structures expected to be seen in an IMB (step 1002). The template may be used to identify a location of the IMB for purposes of subsequent analysis. An example of such a template is illustrated as template 1210 of FIG. 12. As seen, the template 1210 has a set of periodic black lines and white spaces that is representative of the spacing of 65 characters, using the character codes explained above with respect to FIGS. 4A-4B.

In the example shown, one or more image enhancement processes may be performed on the check image (step 1004), such as tilt, deskew, denoise, or other methods, to improve clarity of the IMB included on the check. Once the image is enhanced, the template may be used to identify and isolate the IMB portion of the check image.

Once the portion of the check image that corresponds to the IMB is recognized, a series of image manipulation steps may be performed to enhance the clarity of the IMB code itself. This is because, even after the image enhancement processes, some image deformations may yet exist. For example, due to slight deformation and relatively poor resolution of the check image scan, the line thickness of the vertical bars in the IMB is not uniform and many of them may have indents and outdents. Also, some images may have additional heavy noises on the IMB. These indents, outdents, or heavy noises, sometimes, result in the boundaries of the bars not being well separated. In such a case, the interpretation of the bars into the keys may not be accurate.

To improve the image quality of the IMB and to isolate the specific critical aspects of the IMB (the height and vertical direction of the vertical bars), a set of horizontal dilation, masking, and erosion steps are performed. Specifically, a horizontal dilation process is performed on each of the vertical bars in the IMB (step 1006). This is seen in the sequence of IMB image manipulations 1220 of FIG. 12, moving from the first IMB image (the original image) to an image in which each black vertical bar is significantly horizontally dilated to the point where each may touch but not overlap. After dilation, a mask, shown as the third image in the IMB image manipulation sequence 1220, is applied (step 1008), resulting in separated vertical bars (the fourth image in the IMB image manipulation sequence).

After masking, an erosion process (step 1010) is performed to further separate the vertical black bars, widening the white space therebetween. This helps improve accuracy of interpretation of the bars into key characters. The last image in the IMB image manipulation sequence 1220 shows the result of an erosion process that is performed.

Referring to the overall process of steps 1006-1010, it can be seen that the final IMB representation is significantly clearer and of higher quality than the initial IMB representation, resulting in far greater accuracy of decoding the IMB values.

Continuing discussion of the method 1000, once the IMB is processed as described above, the vertical bars may be recognized to obtain an alphabetical character code (step 1012). This may be performed by comparing the vertical bars to the key described above in Table 1 to determine a sequence of A (ascending), D (descending), F (full), and T (track) values that are represented. The IMB represents a sequence of 65 such characters. Once those characters are recognized from the IMB, that character code may be used to decode various information embedded therein, including at least an addressee ZIP code (which, in the case of an institutional check, corresponds to a ZIP code of the payee). An example decoder of the 65 character code to extract the tracking code, routing code (including delivery ZIP code), service type identifier, mailer ID, Barcode identifier, and serial number is available from the U.S. Postal Service (see https://postalpro.usps.com/ppro-tools/encoder-decoder). In example implementations, such a third party IMB decoder may be used, for example via an API call; in alternative implementations, an analogous decoder may be integrated within the image processing instructions at a deposit institution, or any of devices 12-16 as described above.

It is noted that if any of the 65 characters in the IMB code is converted incorrectly, then retrieval of the appropriate routing information will fail. Accordingly, successful retrieval of the routing information may provide validation of correct conversion of the IMB image to alphabetical code.

Referring now to FIG. 11, a method 1100 for decoding the IMB to obtain payee address information is provided. The method 1100 may be performed, for example, to accomplish step 1012, 1014 of FIG. 10, above.

In some instances, although dilation, masking and erosion handle horizontal noise, there are instances in which vertical noise exists that may cause IMB conversion to fail. For example, as seen in the color-inverted version of the IMG illustrated at diagram 1230 of FIG. 12, discontinuities in the bar may exist (see the fourth bar from the right in diagram 1230). In this instance, the lower extending region of the bar should be considered noise, rather than an incomplete full bar. This would correctly decode to an A (ascending) rather than F (full) because the lower portion of the bar would be considered noise rather than part of the bar itself.

To programmatically recognize the bar positions and account for such circumstances of noise, the method 1100 includes first determining a height of the IMB using aggregated pixel densities (step 1102). This is done using a horizontal summation of pixel densities to find an area of an IMB patch image (a portion of the check image containing the IMB) in which the vertical bars reside. In doing so, a 2D array is created to represent the IMB, with each pixel having a value between 0 (black) and 255 (white). To determine pixel density, the pixel values may be inverted, so that nonempty regions may have higher values. A threshold is also selected, and pixels are assigned to one of two binary values (0 or 255) depending on whether they are above or below the threshold.

To create the horizontal summation, the cell values that have a common vertical axis position are aggregated. This, in effect, projects the vertical bars onto the Y axis. An example representation of a horizontal aggregation of pixel densities is seen in the pixel density chart 1310 of FIG. 13.

As seen specifically in the plot 1310 of FIG. 13, most of the pixels represented by the vertical bars are positioned in a middle range of the plot (e.g., between about pixel positions 10 and 38 in the example shown). Anything outside that range can be considered empty space or vertical noise. Additionally, ascending regions are likely located in the range of pixel positions 10 to 19, track regions are likely located in the range of pixel positions from 19 to 29, and descending regions in the range of pixel positions from 28 to 38. Since every bar has a track region, this makes sense, that the track region has highest aggregate density.

Pixel densities are then compared across the vertical bars to identify lower density bars or regions (step 1104). This includes generating both the horizontal summation seen in plot 1310, but also a vertical summation of pixel density in each vertical bar, seen in plot 1320 of FIG. 13, and plot 1400 of FIG. 14. The vertical summation of pixel density enables identification of the location of each vertical bar horizontally, while the horizontal summation determines the vertical range in which the bars reside in the patch image of the IMB.

Specifically, and referring again to FIG. 13, plot 1320 depicts a normalized summation value in the vertical direction, with the X axis representing the horizontal position of the pixel density plot. Unsurprisingly, there are 65 peaks included in the plot that correspond to the 65 bars in the IMB patch image (e.g., image 1230 described above). In this plot 1320, some peaks have a normalized summation value around 0.4, some have summation values around 0.7, and some have summation values around 1.0. Those bars corresponding to summation values of 1.0 may correspond to a full bar, (the maximum pixel density when aggregated vertically), while the bars having summation values around 0.7 may be ascending or descending bars, and the bars having summation values around 0.4 are likely to be track bars. However, simply using the bar values to assign codes may cause an inaccurate decoding result, since vertical noises may be incorporated in the summed values.

In the example shown, the method 1100 includes calculating pixel densities in each region of the IMB code for each vertical line (e.g., in the track region, the ascending region, and the descending region) (step 1106). By doing so only in the regions identified as the vertical bars (based on the horizontal plots 1320, 1400), noise from other regions in the IMB patch image may be excluded.

For example, as seen in the further pixel density plot 1400 of FIG. 14, there are more than 65 peaks present; as seen on the far left of the plot, two extra small peaks 1402 are present. However, because these are relatively smaller values, they are identified as noise and may be discarded. Additionally, there are some instances where, between two vertical bar density plots, the density does not return to zero. These regions (an example of which is labeled region 1404)

are able to be considered regions in which there may be noise. This noise may be removed prior to analysis of individual bar pixel densities in the peak regions.

To obtain pixel densities in each region for each bar, three density lists of 65 entries are obtained. There will be one density list for each of the track regions, the ascending regions, and the descending regions. A threshold value can be set up for each list, which could be the mean or median of the list, or any specific value that is predetermined. As part of the classification process, a bar is classified as a track bar if and only if its track region density is beyond the threshold and no other region is beyond the threshold. Similarly, a bar is classified as an ascending bar if and only if its track region and ascending region densities are beyond the thresholds respectively. A bar is classified as a descending bar if and only if its track region and descending region densities are beyond the thresholds respectively. Finally, a bar is classified as a full bar if and only if all of its three densities are beyond the thresholds respectively.

The use of individual region densities, and comparison of pixel densities in each region to a particular threshold, reduces the risk of incorrect classifications, by accounting for areas of nonempty pixels, which results in a more robust calculation as compared to simply using the vertical position or height that might otherwise be directly obtained from the plots 1320, 1400. For example, referring back to the diagram 1230 of FIG. 12, the fourth-most bar on the right side has a density value in the ascending region that is greater than the threshold of the ascending region densities, and a density value in the track region that is greater than the threshold of the track region densities. However, there is a density value in the descending region due to existence of the dot, but it is far less than the threshold of the descending region densities. Therefore, the bar is considered to have a valid track region and ascending region, and it is classified as an ascending bar, and the noise in the descending region is properly excluded.

The method 1100 further includes determining a character code based on the denoised vertical bar code (step 1108). Determining the character code may be performed as discussed above, for example by translating the pixel densities in the upper, track, and lower positions into a determination of an ascending, descending, full, or track bar, and assigning an alphabetical code to the result of that determination, which in turn may be used in the IMB decoding process described above.

IV. Fraud Detection Processes

Referring now to FIGS. 15-18, methods of detecting anomalies that indicate potential fraud are described, which utilize some of the same image analysis, template matching, and IMB decoding techniques described above. It is noted that, like personal checks, institutional checks might be altered fraudulently in an effort to obtain illegal gain. Typical alterations may include changing a payee name and address to a person's own name or a fake name and address. This may allow the fraudster to convince a teller that they are the valid owner of the institutional check. In other circumstances, a payee may be proper, but they may attempt to alter (increase) the amount printed on the check to obtain a greater return.

Figure 15:
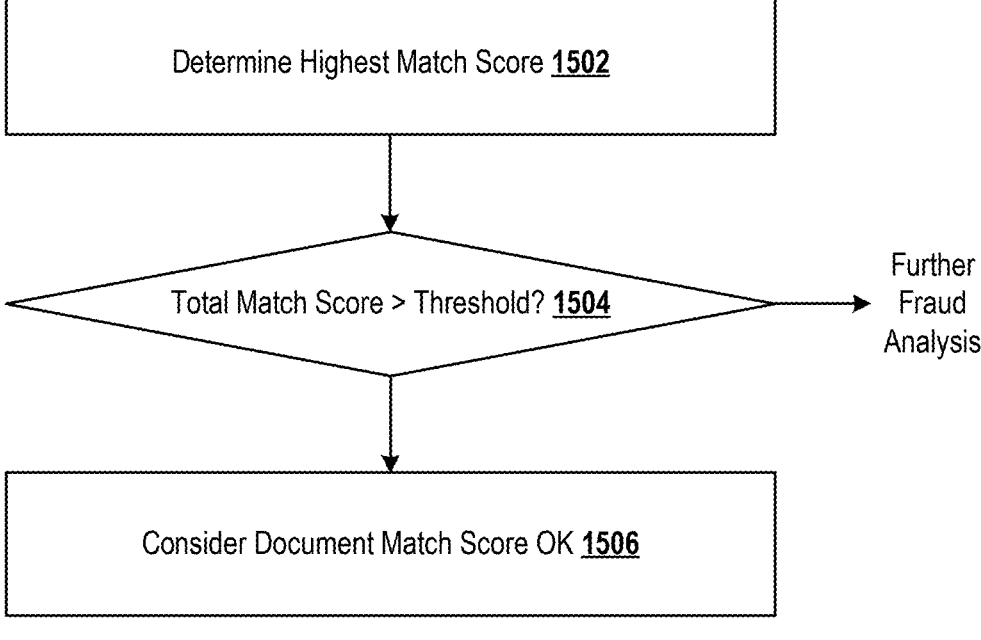
FIG. 15 is a flowchart of a method of comparing match scores of regions of an institutional financial instrument as part of a fraud detection process.

To address these issues, in example embodiments, a method 1500 shown in FIG. 15 is performed to identify the potentiality of fraud. In particular, the method 1500 includes determining a set of highest character match scores present in a given document (step 1502). As noted above, a final result of a selected image is based on a selection of an image having the highest total scores of the top N template matches in key areas of the check, such as the top 30 template matches. These highest total scores may be used to detect potential font alterations. Specifically, the templates created for each character are based on standard fonts used in institutional checks; while these templates may be used to read checks with altered fonts, the highest total scores of the checks with altered fonts will be noticeable lower than the highest total scores for those checks that are genuine. Accordingly, a comparison operation 1504 is performed to determine if any of the highest total match scores is below a predetermined threshold match score. If any of the match scores falls below that threshold, the image of the check may be flagged for further fraud analysis, thereby preventing that check from being automatically cleared and funds released to the depositor. If none of the match scores falls below such a threshold, the document may be considered acceptable, in that none of the key area characters have comparative match scores indicating that the font may be mismatched or otherwise altered (step 1506).

In addition to the possibility of mismatched fonts, it may also be the case that a ZIP code obtained from the IMB may not match a ZIP code printed on the check. This may be due to fraud, or may be due to other circumstances. For example, in some cases, the ZIP code printed on the check may be mis-read because of noise, or because of extra characters or stamps that overlap with that area, such as in the example discussed below in conjunction with FIG. 17C. In this instance, even if a proper ZIP code is extracted from the IMB, the address line text may not have a ZIP code that is identifiable via template matching. This may result in false alarms.

Figure 16:
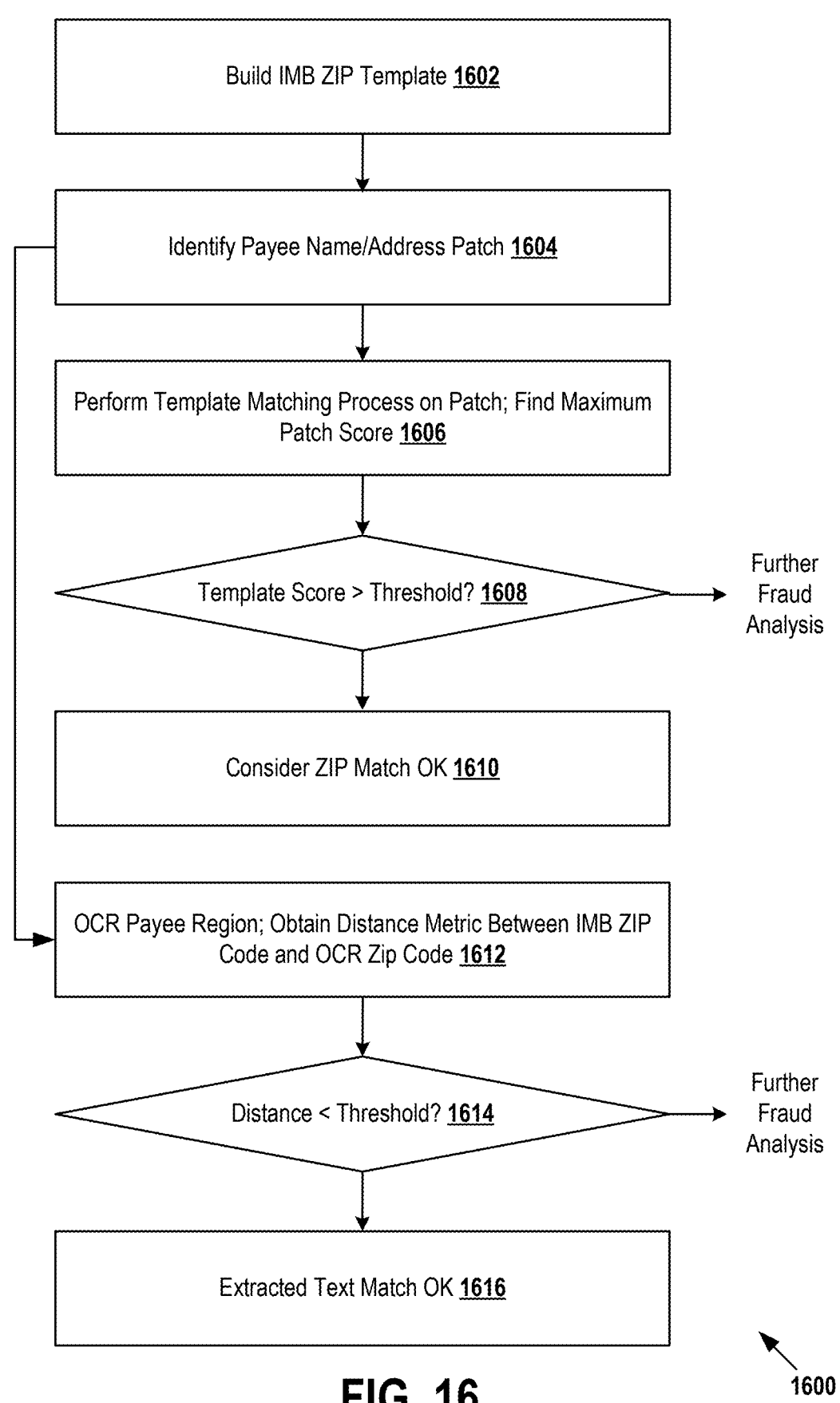
FIG. 16 is a flowchart of an example analysis process using template matching and ZIP code information obtained from an IMB code.

To detect such mismatch based fraud, while reducing the number of false alarms that may be raised, a further method 1600 may be performed, as seen in FIG. 16. In some instances, the method 1600 is used only on check images that have been determined to be potentially fraudulent using the methods of FIG. 15 or other fraud detection processes.

In the example shown, the method 1600 includes building a ZIP code template based on the ZIP code obtained from the IMB depicted in the check image. The ZIP code may be obtained from the IMB using the processes described above in Part III. a new character template may be constructed from the existing character templates, by concatenating together the character templates to form an appropriate ZIP code template. In example implementations, a five digit or a nine digit ZIP code may be used.

In the example shown, the method 1600 further includes identifying a patch within the check image that includes the payee name and address (step 1604). Typically, once a patch containing the IMB is identified using the template matching described in Part III, the image segment including payee name and address may be located (typically directly below the IMB). Using a methodology similar to that described in Part II, above, a template matching process may be performed (step 1606) within the patch of the check image including the payee name and address, comparing individual pixel patch positions to obtain a match score relative to the newly created ZIP code template.

In the example shown, after the matching process is performed to identify location having a maximum match score using the scoring and clustering processes illustrated above, a comparison of the maximum match score for the ZIP code as a whole is made to another threshold (step 1608). In this instance, the threshold for matching to the ZIP code template is lower than the thresholds for matching to individual characters. The use of an expected string of characters to perform template matching offsets the lower match score threshold, such that the presence of the ZIP code within the analyzed patch of the check image at all may be detected despite interfering marks in that region. Accordingly, if a ZIP code match is found with at least the lower threshold, that match is considered acceptable (step 1610).

In addition, or as an alternative to, the ZIP code template matching of steps 1606-1610, the method 1600 may also include performing a separate OCR-based text identification process on at least the payee address region of the check image. The OCR-based text identification process may use the tesseract-ocr optical character recognition engine mentioned above, or equivalents thereof. In this instance, the OCR process may extract a ZIP code despite the presence of marks in the region near the ZIP code, in cases where the character-specific template matching might fail (e.g., due to thresholding used for the fraud detection of FIG. 15, or other reasons). However, the OCR-extracted ZIP code may not exactly match the ZIP code obtained from the IMB. In some examples, these two ZIP codes may be compared, and a distance metric may be determined (step 1612). For example, a fuzzy matching process may be performed on the two text strings representing the OCR ZIP code and the IMB ZIP code to determine a similarity score that may be used as the distance metric.

In an operation 1614, if the distance metric is within a predetermined distance threshold (e.g., off by some percentage of characters, or characters are different in only minor ways), the extracted text may be considered sufficiently similar to the IMB ZIP code to consider the two ZIP codes to match (step 1616), thereby allowing check processing to proceed (i.e., overriding a potential fraud detection issue that might otherwise occur due to failure to capture the ZIP code during template matching with an adequate match score). If, however, the distance metric is not within the predetermined distance threshold, it could be considered that the OCR ZIP code is not able to be detected as sufficiently similar to the IMB ZIP code, and further fraud analysis may be warranted.

Figure 17A:
FIGS. 17A-17C illustrate example alterations to an institutional check that may cause mismatch between the IMB code and printed ZIP code information.
Figure 17B:
Figure 17C:

FIGS. 17A-17C illustrate example alterations to an institutional check that may indicate fraud issues in an institutional check. The example alterations shown are detectable and may or may not indicate fraudulent activity; each may be detected and treated accordingly based on the fraud detection processes described above in FIGS. 15-16.

FIG. 17A illustrates a comparison diagram 1710 showing differences between an extracted information line from a counterfeit treasury check (top line) and a standard treasury check (bottom line). As can be seen, the digits appear differently, particularly the digit "0" in both lines having significant different width. The template of the digit 0 described above, and the template matching process described above, may assist in detecting possible fraud based on a lower character matching score for particular characters. Furthermore, a font used in the first line for the city and state of issuance ("KANSAS CITY, MO") is different from the font used in the standard treasury check, also resulting in lower matching scores. This alteration may be detected based on the match score thresholding process described above in conjunction with FIG. 15.

FIG. 17B illustrates a further comparison diagram 1720 showing differences in an amount line between a fraudulent and standard treasury check. In addition to the digits having different appearance (width and shape of the 0's appearing in the image, among other distinctions) causing lower matching scores, the fonts of the $ symbol and the asterisk * are also significantly different between the lines. This alteration may also be detected based on the match score thresholding process described above in conjunction with FIG. 15.

FIG. 17C illustrates an example of a portion of a check image 1730 that includes a payee ZIP code that may be correct in a check image, but which may not be detectable using template matching processes due to presentation of a date stamp or other indicia that overlays the ZIP code. In this instance, the subsequent creation of a ZIP code specific template and lowered thresholding allows for detection of the ZIP code despite significant interfering marks on the check image. Through use of the techniques described in FIG. 16, and as illustrated in FIG. 18, below, the image may be analyzed and determined to be acceptable even when an initial template matching process (e.g., including the fraud detection thresholding of FIG. 15) might have otherwise indicated the check as potentially fraudulent.

Figure 18:
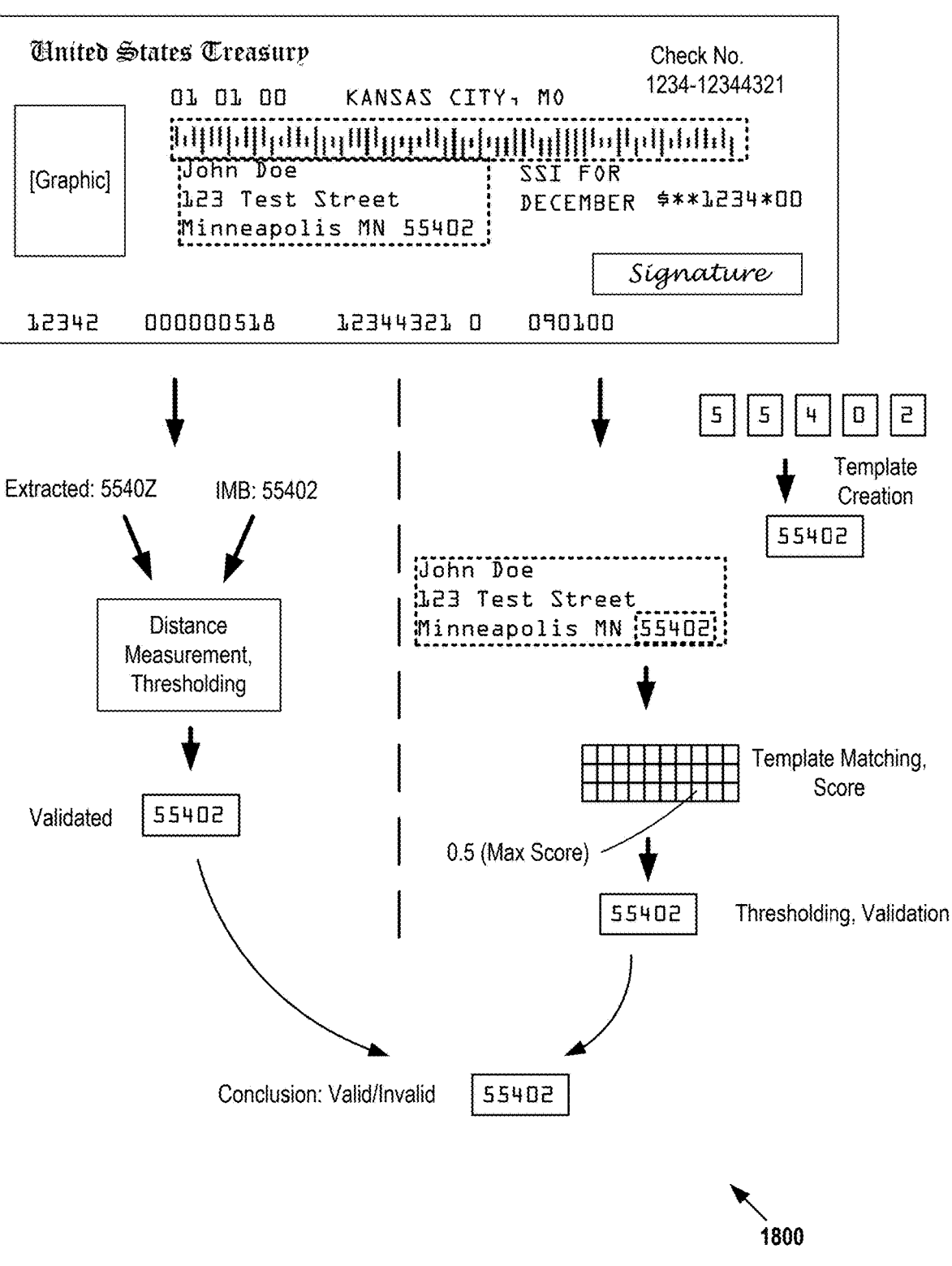
FIG. 18 is a schematic illustration of a fraud detection process that may be useable in conjunction with FIGS. 16-17.

FIG. 18 is a schematic diagram 1800 of fraud detection processes that may be useable in conjunction with FIG. 16. While the fraud detection process of FIG. 15 may be performed alone and detect font or character manipulation issues, the fraud detection processes of FIG. 16 may be performed alone or in combination with that fraud detection process (or with each other) to perform further validation by way of at least one of (1) comparison between a ZIP code identified from the IMB and a ZIP code extracted from textual information on the check, or (2) performing a further template matching on the ZIP code on the check specifically.

In the example as illustrated, on the left side of the diagram 1800, an extracted ZIP code, for example via OCR, is depicted as "5540Z" while an IMB ZIP code is depicted as "55402". Based on a distance measurement obtained, for example, by fuzzy matching the two ZIP codes, it may be determined that the two text strings are within a predetermined distance of one another, so the ZIP code in the text string is considered to be accurate and validated.

On the right side of the diagram 1800, an IMB ZIP code "55402" is used to construct a template "55402" from individual character templates. This ZIP code template is then compared against the check image, or a patch of the check image identified as including the payee address. The patch may be located, as noted above, as being adjacent the IMB. In this example, a further template matching process may be performed, and a maximum score identified by way of clustering analysis. The maximum score is then compared to a lower threshold as noted above, to determine whether the overall ZIP code template may be matched against a location in the check image to thereby identify a match between the IMB ZIP code and the text ZIP code displayed on the check.

Referring to FIGS. 1-18 generally, it is noted that the image processing, character extraction, machine-readable code analysis, and fraud detection processes of the present disclosure provide significant advantages in the context of institutional financial instruments, such as checks. By taking advantage of unique features of these checks including machine-readable codes and regularized fonts, processing of some check features that are important in other contexts (e.g., the payor signature and account/routing numbers) may be emphasized less, or not required at all. Furthermore, the unique features of such checks enable unique fraud detection processes that allow for quick detection of potential alterations to financial instruments, while limiting the number of false positive determinations that may otherwise require further, more time intensive processing. Additionally, because the processes described here are generally not computationally intensive, institutional financial instruments, which are often handled in high volume by financial institutions, may be more quickly processed and with added security.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims. While various factors are described as weighing in favor of or against certain findings of authorship, a person of skill in the art will recognize that the various factors and weightings described herein can be applied in any of a variety of ways (and with any of a variety of different weightings themselves) to achieve a desired outcome.

The invention claimed is:

1. A method comprising:
obtaining a document image of a document that appears on its face to be genuine, wherein the document is actually (a) genuine, (b) forged to cause the document to reflect a larger than originally intended value, or (c) forged to relate to a malicious actor rather than an originally intended individual;
identifying a visual code in the document image;
decoding the visual code to obtain a character code, wherein the decoding includes:
performing one or more image enhancement processes, the one or more image enhancement processes including a tilt fixing process and a noise removal process, wherein the noise removal process includes:
calculating pixel densities of a first region, a second region, and a third region for each of a plurality of vertical bars in the visual code;
comparing the pixel densities of each of the plurality of vertical bars in the first, second, and third regions to detect one or more areas of one or more of the plurality of vertical bars having a lower comparative pixel density relative to corresponding areas of others of the plurality of vertical bars; and
based on detecting the one or more areas having the lower comparative pixel density, considering pixel density in the one or more areas as noise;
applying a horizontal dilation of each of a plurality of vertical bars to generate a dilated image portion;
applying a mask to the dilated image portion to obtain a masked image portion; and
applying an erosion process to the masked image portion;
using the character code to extract encoded information; and
processing the document based on the extracted encoded information.

2. The method of claim 1, wherein processing the document based on the extracted encoded information includes performing a fraud detection process based on determining whether there is an inconsistency between textual information within the document and the extracted encoded information.

3. The method of claim 2, wherein identifying the inconsistency includes:
comparing a first data of an individual from the extracted encoded information to second data from within the document image other than the visual code.

4. The method of claim 2, further comprising:

based on the fraud detection process, routing the document image for additional fraud analysis and remediation rather than permitting further processing without additional fraud analysis.

5. The method of claim 1, wherein the first region is a tracking region of the visual code;

wherein the second region is an ascending region of the visual code; and wherein the third region is a descending region of the visual code.

6. The method of claim 1, further comprising performing a text extraction process on the document image to obtain textual information, wherein performing the text extraction process includes performing a template matching process including:

for each template of a list of templates representative of alphanumeric characters and symbols in a predetermined font associated with the document, generating a match score array corresponding to each of a plurality of patches within the document image, the plurality of patches being sized corresponding to an expected character size; and performing a cluster analysis on the match score array associated with each template to identify locations and distinct instances of each character appearing in the document image, wherein processing the document is further based on the textual information.

7. The method of claim 6, wherein performing the cluster analysis includes clustering localized match scores above a threshold and identifying a best-match position for each character based on a highest match score within a cluster.

8. The method of claim 1, further comprising generating the document image from an original document image, wherein the document image is included among a plurality of document images generated from the original document image at different size ratios relative to the original document image.

9. The method of claim 8, further comprising performing one or both of:

adjusting a tilt angle of the original document image; or applying one or more denoising filters to the document image.

10. The method of claim 1, wherein the document image further depicts a data matrix comprising a two-dimensional barcode.

11. The method of claim 1, further comprising decoding the plurality of vertical bars depicted in the masked image portion to obtain the character code.

12. The method of claim 1, wherein the noise removal process is performed in response to a mismatch being detected.

13. The method of claim 1, wherein the visual code is an Intelligent Mail Barcode (IMB).

14. The method of claim 13, wherein using the character code to extract encoded information includes retrieving mail delivery information from a remote system based on the character code.

15. A method for detecting and remediating anomalies, the method comprising:

performing a text extraction process on a document image of a document to obtain document textual information, wherein performing the text extraction process includes one or both of:

(1) performing a template matching process using one or more predefined templates of alphanumeric characters and symbols in a predetermined font commonly used in documents similarto the document represented in the document image; or (2) performing an artificial intelligence analysis process on the document image to identify and extract textual data and account for variations in handwriting, fonts and document layout;

decoding an intelligentmail barcode (IMB) in the document image to obtain a character code that encodes document-related details and information, wherein decoding the IMB includes performing a noise removal process that includes applying a mask to a portion of the document and applying an erosion process to the masked document image portion to extract the decoded character code;

utilizing the decoded character code to extract encoded information, wherein a matching threshold used to extract a first type of information is lower than a character matching threshold used to extract other information to resist failure to identify the first type of information despite the presence of one or more interfering marks;

performing a fraud detection process on the document image wherein the fraud detection process includes:

comparing a ZIP code template representative of a ZIP code obtained from the IMB to perform a comparison against a predefined region of document image containing a name or address to identify a presence of the ZIP code in the predefined region; or identifying the predefined region of the document image containing the name and address using predefined location markers such as a location of a particular field relative to other fields on the document; and based on the fraud detection process, either routing the document for additional fraud analysis and remediation responsive to anomalies being found or permitting further processing without additional fraud analysis responsive to no anomalies being found.

16. The method of claim 15, wherein performing the text extraction process includes performing the template matching process, and wherein performing the template matching process includes:

obtaining a list of templates representative of alphanumeric characters and symbols in the predetermined font commonly used in documents, and selected to account for variations in print quality, resolution or distortions in the document image;

for each template in the set of templates, dividing the document image into a plurality of patches, each patch having dimensions expected for a size of a character in the predetermined font, and generating a match score array for each patch by comparing the patch to the template, where each match score of the match score array quantifies the degree of similarity between a respective patch and the template; and performing a cluster analysis on the match score array associated with each template to identify high match scores that correspond to locations of characters in the document image and distinguish distinct instances of each character by analyzing a spatial distribution and score patterns within clusters formed by the cluster analysis, ensuring accurate identification of details within the document image.

17. The method of claim 16, wherein performing the cluster analysis includes clustering localized match scores above a threshold and, for each character, identifying a best-match position based on a highest match score within a cluster.

18. A system comprising a set of one or more non-transitory computer readable media having instructions stored thereby that, when executed by a set of one or more processors cause the one or more processors to perform a method comprising:

obtaining a document image of a document that appears on its face to be genuine, wherein the document is either genuine or forged to have altered information;

identifying a document code in the document image;

decoding the document code to obtain a character code, wherein the decoding includes:

performing a noise removal process that includes:

calculating pixel densities within the document code;

comparing the pixel densities to detect one or more regions of the document code having a lower comparative pixel density relative to corresponding regions of others of the plurality of vertical bars; and based on detecting the one or more regions having the lower comparative pixel density, considering pixel density in the one or more regions as noise;

applying a horizontal dilation to generate a dilated document image portion;

applying a mask to the dilated document image portion to obtain a masked document image portion; and applying an erosion process to the masked document image portion;

extracting encoded document information from the document code;

performing a fraud detection process on the document image based on an amount of inconsistency between the document textual information and the encoded document information; and based on the fraud detection process, routing the document image for additional fraud analysis and remediation rather than permitting further processing without additional fraud analysis.

19. The system of claim 18, further comprising:

the document; and a mobile device, wherein obtaining the document image includes obtaining the document image from the mobile device.

\* \* \* \* \*